(12) United States Patent
Jacob et al.

(10) Patent No.: US 9,912,609 B2
(45) Date of Patent: Mar. 6, 2018

(54) PLACEMENT POLICY-BASED ALLOCATION OF COMPUTING RESOURCES

(71) Applicant: Oracle International Corporation, Redwood Shores, CA (US)

(72) Inventors: Vinod Pathikulangara Jacob, Bangalore (IN); Gopal Kirsur, San Ramon, CA (US); Albin Abraham Jacob, Bangalore (IN); Muhammad Riyas Vattakkandy, Bangalore (IN); Kiran Malpati Ravindraiah, Bangalore (IN); Nirguna Kota, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 201 days.

(21) Appl. No.: 14/819,922

(22) Filed: Aug. 6, 2015

(65) Prior Publication Data

US 2016/0043968 A1    Feb. 11, 2016

Related U.S. Application Data

(60) Provisional application No. 62/035,370, filed on Aug. 8, 2014.

(51) Int. Cl.
*H04L 12/927*    (2013.01)
*H04L 12/24*    (2006.01)
(Continued)

(52) U.S. Cl.
CPC .......... *H04L 47/808* (2013.01); *G06F 9/5061* (2013.01); *H04L 41/0893* (2013.01); *H04L 47/827* (2013.01); *H04L 67/32* (2013.01)

(58) Field of Classification Search
CPC .......................... H04L 41/0893; H04L 47/827
See application file for complete search history.

(56) References Cited

U.S. PATENT DOCUMENTS

| 8,370,312 B1* | 2/2013 | Sawhney ............ H04L 67/1097 707/694 |
| 8,484,353 B1* | 7/2013 | Johnson ................ G06F 9/5077 370/312 |

(Continued)

FOREIGN PATENT DOCUMENTS

| CN | 102577270 B | 12/2014 |
| CN | 106576114 | 4/2017 |

(Continued)

OTHER PUBLICATIONS

U.S. Appl. No. 14/819,815, filed Aug. 6, 2015, Jacob et al.
(Continued)

*Primary Examiner* — Lashonda Jacobs
(74) *Attorney, Agent, or Firm* — Kilpatrick Townsend & Stockton LLP

(57) ABSTRACT

Techniques are disclosed for managing and allocating resources based on resource policies in response to user requests. A resource management system can receive a request for a service. A request may indicate preferences for allocation resources (e.g., a resource definition) to enable the service. A resource definition may indicate a topology of the computing resources to allocate for the user. The topology may indicate what computing resources to allocate and how to allocate those computing resource. Based on the information indicated by a request, the resource management system may determine a placement policy for allocation of computing resources indicated by the request. A placement policy may indicate a placement of one or more computing resources requested by a user. The placement policy may indicate where and how computing resources are to be placed once allocated. The computing resources may be allocated based on the placement policy and the resource definition.

20 Claims, 10 Drawing Sheets

(51) Int. Cl.
  *H04L 12/911* (2013.01)
  *H04L 29/08* (2006.01)
  *G06F 9/50* (2006.01)

(56) References Cited

U.S. PATENT DOCUMENTS

| | | | |
|---|---|---|---|
| 8,615,528 B2 | 12/2013 | Shah | |
| 8,619,779 B2 | 12/2013 | Li et al. | |
| 8,701,115 B2 | 4/2014 | Bhandari et al. | |
| 8,832,249 B2 | 9/2014 | Kuo et al. | |
| 8,850,449 B2 | 9/2014 | Hiltunen et al. | |
| 8,856,386 B2 | 10/2014 | Dutta et al. | |
| 8,909,767 B2 | 12/2014 | Sunkara et al. | |
| 8,954,487 B2 | 2/2015 | Jung et al. | |
| 9,032,077 B1 | 5/2015 | Klein et al. | |
| 9,154,589 B1 | 10/2015 | Klein et al. | |
| 9,239,996 B2 | 1/2016 | Moorthi et al. | |
| 9,256,467 B1* | 2/2016 | Singh | G06F 9/5055 |
| 9,274,849 B1* | 3/2016 | Estes | G06F 9/5072 |
| 9,400,689 B2* | 7/2016 | Banzhaf | G06F 9/5077 |
| 9,612,865 B2 | 4/2017 | Cao et al. | |
| 9,621,427 B1* | 4/2017 | Shah | H04L 41/12 |
| 9,621,435 B2* | 4/2017 | Vasudevan | H04L 41/50 |
| 2002/0120744 A1 | 8/2002 | Chellis et al. | |
| 2003/0135609 A1 | 7/2003 | Carlson et al. | |
| 2004/0167959 A1 | 8/2004 | Doyle et al. | |
| 2004/0267865 A1 | 12/2004 | Cuervo | |
| 2006/0085530 A1 | 4/2006 | Garrett | |
| 2006/0116998 A1 | 6/2006 | Marr | |
| 2006/0160546 A1 | 7/2006 | Tang et al. | |
| 2008/0080396 A1 | 4/2008 | Meijer et al. | |
| 2010/0325191 A1 | 12/2010 | Jung et al. | |
| 2011/0213884 A1 | 9/2011 | Ferris et al. | |
| 2012/0239792 A1 | 9/2012 | Banerjee et al. | |
| 2012/0271949 A1 | 10/2012 | Radhakrishnan et al. | |
| 2012/0324112 A1* | 12/2012 | Dow | G06F 9/5033 709/226 |
| 2013/0031028 A1 | 1/2013 | Martin | |
| 2013/0080619 A1 | 3/2013 | Assuncao et al. | |
| 2013/0097601 A1 | 4/2013 | Podvratnik et al. | |
| 2013/0185438 A1 | 7/2013 | Lumezanu et al. | |
| 2014/0019961 A1* | 1/2014 | Neuse | G06F 9/5088 718/1 |
| 2014/0225896 A1 | 8/2014 | Zhang et al. | |
| 2014/0273928 A1 | 9/2014 | Dobbs | |
| 2014/0279353 A1 | 9/2014 | Findlan et al. | |
| 2014/0344809 A1* | 11/2014 | Jin | H04L 67/2823 718/1 |
| 2014/0365662 A1* | 12/2014 | Dave | H04L 67/10 709/226 |
| 2015/0113144 A1* | 4/2015 | Bauer | H04L 47/70 709/226 |
| 2015/0120937 A1* | 4/2015 | Mordani | H04L 41/5054 709/226 |
| 2015/0163157 A1* | 6/2015 | Hao | G06F 9/5072 709/226 |
| 2016/0043967 A1 | 2/2016 | Jacob et al. | |
| 2016/0043970 A1 | 2/2016 | Jacob et al. | |
| 2016/0142338 A1* | 5/2016 | Steinder | H04L 41/0813 709/226 |
| 2016/0253195 A1* | 9/2016 | Banzhaf | G06F 9/5077 |

FOREIGN PATENT DOCUMENTS

| | | |
|---|---|---|
| CN | 106664321 | 5/2017 |
| EP | 3177995 | 6/2017 |
| EP | 3177997 | 6/2017 |
| JP | 2017524202 | 8/2017 |
| JP | 2017529593 | 10/2017 |
| KR | 20170042638 | 4/2017 |
| WO | 2011/041159 A1 | 4/2011 |
| WO | 2013/009287 A1 | 1/2013 |
| WO | 2014039918 A1 | 3/2014 |
| WO | 2014/150158 A1 | 9/2014 |
| WO | 2014/165507 A1 | 10/2014 |
| WO | 2016022908 A1 | 2/2016 |
| WO | 2016022925 A2 | 2/2016 |
| WO | 2016022925 A3 | 4/2016 |

OTHER PUBLICATIONS

U.S. Appl. No. 14/819,827, filed Aug. 6, 2015, Jacob et al.
International Patent Application No. PCT/US2015/044187 filed Aug. 7, 2015, Oracle International Corporation.
International Patent Application No. PCT/US2015/044216 filed Aug. 7, 2015, Oracle International Corporation.
International Application No. PCT/US2015/044187, International Search Report and written opinion dated Oct. 22, 2015, 14 pages.
International Application No. PCT/US2015/044216, International Search Report and Written Opinion dated Feb. 24, 2016, 25 pages.
International Application No. PCT/US2015/044216, Invitation to Pay Add'l Fees and Partial Search Rpt dated Oct. 30, 2015, 5 pages.
International Application No. PCT/US2015/044187, Written Opinion dated Jul. 5, 2016, 9 pages.
International Application No. PCT/US2015/044216, International Preliminary Report on Patentability dated Dec. 23, 2016, 22 pages.
International Application No. PCT/US2015/044187, International Preliminary Report on Patentability dated Oct. 7, 2016, 10 pages.
International Application No. PCT/US2015/044216, Written Opinion dated Oct. 13, 2016, 19 pages.
U.S. Appl. No. 14/819,815, Non-Final Office Action dated Jul. 27, 2017, 21 pages.
U.S. Appl. No. 14/819,815, Interview Summary dated Oct. 2, 2017, 3 pages.
U.S. Appl. No. 14/819,827, Non-Final Office Action dated Jun. 2, 2017, 17 pages.
International Application No. PCT/US2015/044216, Invitation to Restrict or Pay Additional Fees dated Jul. 11, 2016, 5 pages.

* cited by examiner

| VIRTUAL MACHINE IDENTIFIER(S) 402 | NUMBER OF PROCESSORS (CPUs) 404 | AMOUNT OF MEMORY 406 | VIRTUAL MACHINE NAME(S) 408 | OPERATING SYSTEM (OS) TYPE 410 | GROUP IDENTIFIER 412 |
|---|---|---|---|---|---|

PLACEMENT POLICY-BASED ALLOCATION OF COMPUTING RESOURCES

CROSS-REFERENCES TO RELATED APPLICATIONS

The present application claims priority and benefit from U.S. Provisional Application No. 62/035,370, filed Aug. 8, 2014, entitled "RESOURCE MANAGEMENT AND ALLOCATION SYSTEM," the entire content of which is incorporated herein by reference for all purposes.

BACKGROUND

The present disclosure relates generally to computing infrastructure systems, and more particularly to managing and allocating resources based on resource policies in response to user requests.

In a distributed-computing environment such as a cloud computing environment is a model of service delivery for enabling convenient, on-demand network access to a shared pool of computing resources (e.g. networks, network bandwidth, servers, PODs, processing, memory, storage, applications, virtual machines, services, etc.) that can be rapidly provisioned and released with minimal management effort or interaction with a provider of the service. The provider may provide a variety of services via the distributed computing environment. These services may include one or more services provided under Software as a Service (SaaS) category, Platform as a Service (PaaS) category, Infrastructure as a Service (IaaS) category, or other categories of services including hybrid services.

A user (e.g., a customer or client), via an order or service subscription, may order one or more of the services provided by the distributed computing environment. The distributed computing environment then performs processing (e.g., provisioning, managing, and tracking) to provide the services requested within the user's subscription order. Typically, when the provider (e.g., a cloud service provider) receives an order or service subscription subscribing to the one or more services, the distributed computing environment provisions or allocates the computing resources for the one or more services to the requesting user. However, the requesting user does not have control over how the computing resources are provisioned. These challenges may present automation, performance, and usability issues, which cannot be readily addressed by existing distributed computing environments that provision or allocate computing resources.

In the case of IaaS services providers, requests may be received for computing resources (e.g., networks, servers, storage, applications, and services) from clients and returns corresponding computing resources to the requestor from a pool of computing resources. However, users do not have control over the location of the computing resources or how computing resources are grouped (e.g., based on geography or at the machine-level). These challenges may present security, performance, and isolation issues, which cannot be readily addressed by existing systems that provide resources.

Some IaaS providers may pre-create resources that are commonly used together and provision resources in groups whenever any one of those resources are requested and cleaned up (e.g., returned to the resource pool). However, these groups are statically defined and may not adapt to changing demand for resources and may lead to the provisioning and cleaning-up of resources that have not been used.

BRIEF SUMMARY

The present disclosure relates generally to improving the management and provisioning of resources. The resources may be provided for services requested by a user. Certain techniques are disclosed for managing and provisioning of computing resources based on user requests. Based on user requests, policies may be identified to determine provisioning and configuration of resources. Such techniques may be implemented to reduce or nullify infrastructure setup time, automate repeatable complex integrations, avoid human intervention, and provide better management and usability of the computing resources.

In some embodiments, the present invention provides the user with the ability to control the provisioning of the computing resources (e.g. networks, network bandwidth, servers, PODs, processing, memory, storage, applications, virtual machines, services, etc.) to some extent based on the policies. The policies may be chosen based on user preferences for requesting a service, which can include a request for specific computing resources. For example, the user can have the ability to specify a geographical location of where the resources are provisioned; if the service is a multi-tenant service (e.g., the same resource can be shared by two separate users), the user can have the ability to indicate that the user does not want to share the resource; if the service is a multi-tenant service, the user can have the ability to indicate an affinity towards a particular tenant (e.g., the user can have the ability to indicate that they want to share a resource with tenant X), or in contrast, the user can have the ability to indicate that they do not want to share with a particular tenant; the user can have the ability to control separate POD provisioning and service provisioning for services; etc.

In some embodiments, a resource management system is disclosed which can receive a request. A request may correspond to a subscription order for one or more services. The request may indicate user preferences for allocating resources provided for a service. In some embodiments, the request may include information indicating a resource definition for allocation of computing resources to a user. A resource definition may indicate a topology of the computing resources to allocate for the user. The topology may indicate what computing resources to allocate and how to allocate those computing resource. Based on the information indicated by a request, the resource management system may determine a placement policy for allocation of computing resources indicated by the request. A placement policy may indicate a placement of one or more computing resources requested by a user. The placement policy may indicate where and how computing resources are to be placed once allocated.

In some embodiments, a request may additionally or alternatively include a placement configuration to determine placement of computing resources. A placement configuration may indicate placement of computing resources such as a geographic location, isolation of particular computing resources from tenants in a multi-tenant environment, sharing of computing resources with tenants in a multi-tenant environment, a physical configuration of computing resources, and a logical organization of computing resources into one or more computing resource units.

The resource management system enables users to request allocation of computing resources based on factor relevant to a user of the computing resources. Traditional systems may not enable a user to request allocation of computing resources based characteristics relevant to the user such as security considerations (e.g., sharing of resources or environments), performance considerations (e.g., allocation of hypervisors to virtual machines), user-specific preferences, or geographic considerations (e.g., geographical location of computing resources to improve performance). Embodiments of the present invention address these and other issues related to allocation and management of computing resources based on user's needs.

In some embodiments, placement policy-based resource allocation may be implemented by a computing system. The computing system may be part of a resource management system. The computing system may be configured to implement methods and operations described herein. Yet other embodiments relate to systems and machine-readable tangible storage media, which employ or store instructions for methods and operations described herein.

In at least one embodiment, a method may include receiving a request for a service. The method may include identifying a definition of a plurality of computing resources based on the request. The method may include determining a placement policy indicating a placement configuration of the plurality of computing resources. The method may include allocating, using the placement policy and the definition, the plurality of computing resources in a resource infrastructure system. A resource infrastructure system may include one or more data centers.

In certain embodiments, a request may include a definition. The definition may indicate one or more types of computing resources and a quantity of each of the types of computing resource. A definition may include a processor definition, a memory definition, a virtual machine definition, or a combination thereof. A virtual machine definition may identify a set of virtual machines.

In certain embodiments, a request may indicate a type of service for use of a plurality of computing resources. The definition may be identified based on the type of service. For example, a definition is identified based on a service for deployment using the plurality of computing resources.

In some embodiments, the method may include establishing, according to the placement configuration, a placement of the plurality of computing resources in the resource infrastructure system. The placement configuration may include characteristics for placement of computing resources requested by a user. For example, the placement configuration may include a geographic location where placement of the plurality of resources is established. In some embodiments, a placement configuration may indicate one or more groups of computing resources. For example, a placement configuration identifies a set of virtual machines allocated to a first group of the plurality of groups. A first computing resource of the plurality of computing resources is allocated to the first group based on the placement configuration. In some embodiments, a placement configuration may include a security configuration to prevent access to the plurality of computing resources by other computing resources. For example, a security configuration may indicate one or more hypervisors allocated to manage the plurality of computing resources. The security configuration may indicate a set of virtual machines allocated to the hypervisor to support the plurality of computing resources. In another example, a placement configuration includes a performance configuration. The performance configuration may indicate a first computing resource allocated to a first hypervisor and may indicate a second computing resource allocated to a second hypervisor. The plurality of computing resources includes the first computing resource and the second computing resource.

The foregoing, together with other features and embodiments will become more apparent upon referring to the following specification, claims, and accompanying drawings.

BRIEF DESCRIPTION OF THE DRAWINGS

FIG. 4 depicts an example of a data structure for storing a definition of one or more computing resources according to some embodiments of the present invention.

DETAILED DESCRIPTION

Figure 1A:
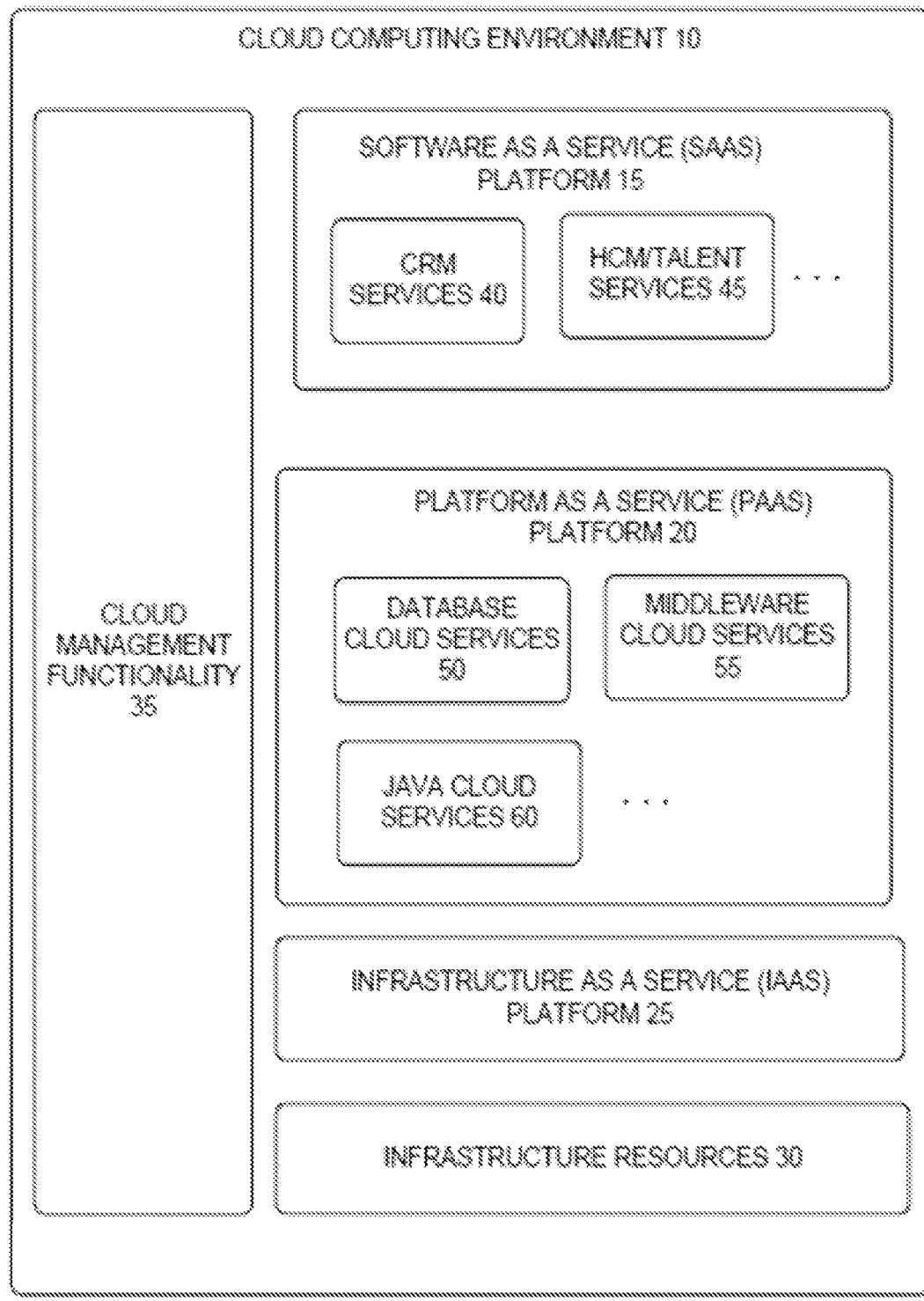
FIG. 1A is a logical view of a cloud infrastructure system according to an embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

The present disclosure relates generally to managing and allocating computing resources based on user preferences. For purposes of this disclosure, it is assumed that the management and allocation of the computing resources is performed at least in part in response to one or more subscription orders subscribing to one or more services provided by a service provider of a distributed computing environment such as a cloud computing environment. While some embodiments have been disclosed herein with respect to managing and allocating computing resources provided under service models including Software as a Service (SaaS), Platform as a Service (PaaS), Infrastructure as a Service (IaaS), this is not intended to be restrictive. In addition to SaaS, PaaS, and IaaS, the teachings disclosed herein can also be applied to other service models. For example, the teachings are applicable to any model of service delivery for enabling convenient, on-demand network access to a shared pool of computing resources (e.g. networks, network bandwidth, servers, PODs, processing, memory, storage, applications, virtual machines, services, etc.).

In certain embodiments, a distributed computing environment such as a cloud computing environment may include a suite of applications, middleware and database service offerings that are delivered to a user in a self-service, subscription-based, elastically scalable, reliable, highly available, and secure manner. The cloud computing environment may provide many capabilities including, but not limited to, provisioning, managing and tracking a user's subscription for services and resources in the cloud computing environment, providing predictable operating expenses to users utilizing the services in the cloud computing environment, providing robust identity domain separation and protection of a user's data in the cloud computing environment, providing users with a transparent architecture and control of the design of the cloud computing environment, providing users assured data protection and compliance with data privacy standards and regulations, providing users with an integrated development experience for building and deploying services in the cloud computing environment and providing users with a seamless integration between business software, middleware, database and infrastructure services in the cloud computing environment.

In certain embodiments, services provided by the cloud infrastructure system may include a host of services that are made available to users of the cloud computing environment on demand such as online data storage and backup solutions, Web-based e-mail services, hosted office suites and document collaboration services, database processing, managed technical support services and the like. Services provided by the cloud computing environment can dynamically scale to meet the needs of its users. A specific instantiation of a service provided by cloud computing environment is referred to herein as a service instance. In general, any service made available to a user via a communication network such as the Internet from a cloud service provider's system is referred to as a cloud service. Typically, in a public cloud environment, servers and systems that make up the cloud service provider's system are different from the user's own on-premises servers and systems. For example, a cloud service provider's system may host an application and a user may, via a communication network such as the Internet, on demand, order and use the application.

A service in a computer network cloud infrastructure includes protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and script-language middleware engine for private use by a networked developer. As another example, a service can include access to an email software application hosted on a cloud vendor's web site.

FIG. 1A is a logical view of a cloud computing environment 10 according to some embodiments of the present invention. Cloud computing environment 10 may provide a variety of services via a cloud or networked environment. These services may include one or more services provided under SaaS, PaaS, IaaS, or other categories of services including hybrid services. A user, via a subscription order, may order one or more services provided by cloud comput-ing environment 10. Cloud computing environment 10 then performs processing to provide the services in the user's subscription order.

Cloud computing environment 10 may provide the cloud services via different deployment models. For example, services may be provided under a public cloud model where cloud computing environment 10 is owned by an organization selling cloud services (e.g., owned by Oracle) and the services are made available to the general public or different industry enterprises. As another example, services may be provided under a private cloud model where cloud computing environment 10 is operated solely for a single organization and may provide services for one or more entities within the organization. The cloud services may also be provided under a community cloud model where cloud infrastructure system 100 and the services provided by cloud computing environment 10 are shared by several organizations in a related community. The cloud services may also be provided under a hybrid cloud model, which is a combination of two or more different models.

As shown in FIG. 1A, cloud computing environment 10 may comprise multiple components, which working in conjunction, enable provision of services provided by cloud computing environment 10. In the embodiment illustrated in FIG. 1A, cloud computing environment 10 includes a SaaS platform 15, a PaaS platform 20, an IaaS platform 25, infrastructure resources 30, and cloud management functionality 35. These components may be implemented in hardware, or software, or combinations thereof.

SaaS platform 15 is configured to provide cloud services that fall under the SaaS category. For example, SaaS platform 15 may provide capabilities to build and deliver a suite of on-demand applications on an integrated development and deployment platform. SaaS platform 15 may manage and control the underlying software and infrastructure for providing the SaaS services. By utilizing the services provided by SaaS platform 15, users can utilize applications executing on cloud computing environment 10. Users can acquire the application services without the need for users to purchase separate licenses and support.

Various different SaaS services may be provided. Examples include without limitation services that provide solutions for sales performance management, enterprise integration and business flexibility for large organizations, and the like. In one embodiment, the SaaS services may include User Relationship Management (CRM) services 40 (e.g., Fusion CRM services provided by the Oracle cloud), Human Capital Management (HCM)/Talent Management services 45, and the like. CRM services 40 may include services directed to reporting and management of a sales activity cycle to a user, and others. HCM/Talent services 45 may include services directed to providing global workforce lifecycle management and talent management services to a user.

Various different PaaS services may be provided by PaaS platform 20 in a standardized, shared and elastically scalable application development and deployment platform. Examples of PaaS services may include without limitation services that enable organizations (such as Oracle) to consolidate existing applications on a shared, common architecture, as well as the ability to build new applications that leverage the shared services provided by the platform. PaaS platform 20 may manage and control the underlying software and infrastructure for providing the PaaS services. Users can acquire the PaaS services provided by cloud computing environment 10 without the need for users to purchase separate licenses and support. Examples of PaaS services include without limitation Oracle Java Cloud Service (JCS), Oracle Database Cloud Service (DBCS), and others.

By utilizing the services provided by PaaS platform 20, users can utilize programming languages and tools supported by cloud computing environment 10 and also control the deployed services. In some embodiments, PaaS services provided by the cloud computing environment 10 may include database cloud services 50, middleware cloud services (e.g., Oracle Fusion Middleware services) 55 and Java cloud services 60. In one embodiment, database cloud services 50 may support shared service deployment models that enable organizations to pool database resources and offer users a database-as-a-service in the form of a database cloud, middleware cloud services 55 provides a platform for users to develop and deploy various business applications and Java cloud services 60 provides a platform for users to deploy Java applications, in the cloud computing environment 10. The components in SaaS platform 15 and PaaS platform 20 illustrated in FIG. 1A are meant for illustrative purposes only and are not intended to limit the scope of embodiments of the present invention. In alternate embodiments, SaaS platform 15 and PaaS platform 20 may include additional components for providing additional services to the users of cloud computing environment 10.

Various different IaaS services may be provided by IaaS platform 20. The IaaS services facilitate the management and control of the underlying computing resources such as storage, networks, and other fundamental computing resources for users utilizing services provided by the SaaS platform and the PaaS platform.

In certain embodiments, the cloud computing environment 10 includes infrastructure resources 30 for providing the resources used to provide various services to users of the cloud computing environment 10. In one embodiment, infrastructure resources 30 includes pre-created and optimized combinations (e.g., groups or sets) of hardware such as servers, storage and networking resources to execute the services provided by the PaaS platform and the SaaS platform.

In certain embodiments, cloud management functionality 35 provides comprehensive management of cloud services (e.g., SaaS, PaaS, IaaS services) in the cloud computing environment 10. In one embodiment, cloud management functionality 35 includes capabilities for provisioning, managing and tracking a user's order or subscription received by the cloud infrastructure system 10, and the like.

Figure 1B:
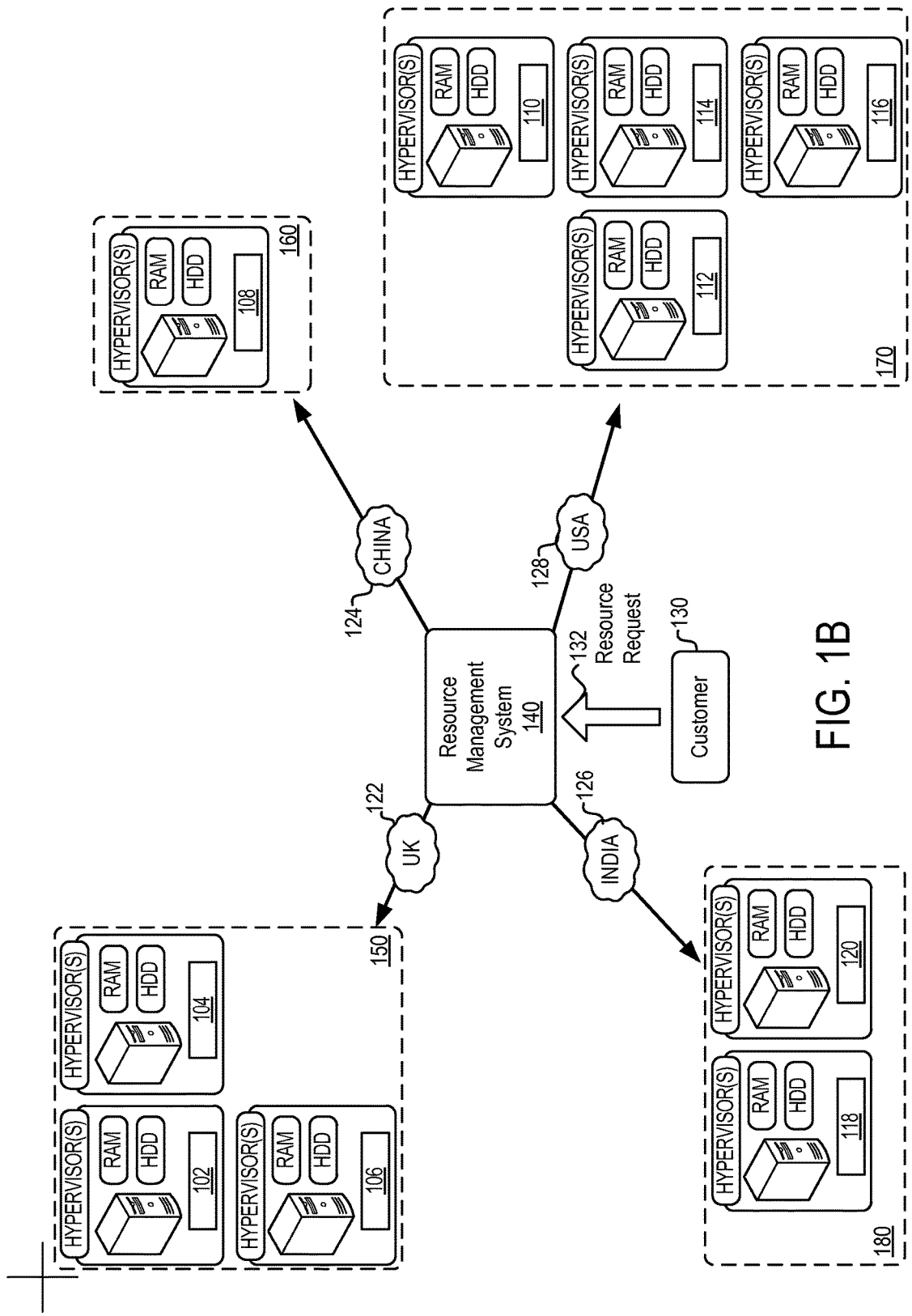
FIG. 1B depicts a simplified diagram of a placement policy-based resource allocation and management system according to an embodiment of the present invention.

Some embodiments, such as systems, methods, and machine-readable media, are disclosed for a placement policy-based resource allocation and management system. FIG. 1B depicts a simplified diagram of a placement policy-based resource allocation and management system 100 according to an embodiment of the present invention. System 100 may include a resource management system 140 that handles allocation and management of computing resources. In some embodiments, system 100 may be implemented in a cloud computing environment, e.g., cloud computing environment 10. Resource management system 140 may be in communication with the cloud computing environment or may be implemented in cloud computing environment. Resource management system 140 may provide services as via a cloud or networked environment. For example, resource management system 140 may provide services as part of cloud computing environment 10. In some embodiments, for management and provisioning of computing resources, cloud computing environment 10 may request resource management system 140 to allocate resources based on a request for services. The resources may be allocated based on preferences indicated by a user.

Computing resources may include, without limitation, a processing unit (e.g., a processor, multiple processors, or a multicore processor), a memory, a virtual machine, a hypervisor, networks, network bandwidth, servers, PODs, storage, applications, virtual machines, services, or other types of computing resources. A POD is a logical entity that can represent one of the following: a pre-provisioned anonymous single-tenant deployment (as is the case for the Java service); or a multi-tenant stack (physical or virtualized) that serves multiple tenants (as is the case for the database service). For example, a POD is a deployment of a service on a physical stack. A POD can house one or more service instances. A POD can be created a priori or can be created on-demand when a service instance is created for a given customer. In some instances, a POD is an instantiation of a software stack for running a service. A POD is thus used to run a service. For example, a POD corresponding to Java service may comprise a stack of virtual machines. As another example, a POD for a database service may comprise an instance of a database. A POD may be considered as a subsystem that is capable of hosting a service. Different PODs may be used for different services.

Computing resources may be allocated to one or more groups of computing resource. Each group of computing resources may be referred herein as "a computing resource unit". FIG. 1B shows an example of computing resource units 102, 104, 106, 108, 110, 112, 114, 116, 118, and 120. Each computing resource unit may include one or more computing resources. A computing resource may be allocated for one or more computing resource units. Computing resources may be allocated in one or more data centers, each of which may be located in different geographical regions. Each geographical region may be separated by one or more networks providing communication with those geographical regions. For example, computing resource units 102, 104, 106 may be located in a data center 150 in the United Kingdom accessible via network 122, computing resource unit 108 may be located in a data center 160 in China accessible via network 124, computing resource units 118, 120 may be located in data center 180 in India accessible via network 126, and computing resource units 110, 112, 114, 116 may be located in a data center 170 in the United States of America accessible via network 128.

Traditional service providers, such as IaaS, SaaS, and PaaS providers provision and allocate resources in a manner that is most cost effective to the provider, and do not enable a user to define how or where the resources are provisioned to best suit the user's needs. Many prior art systems, for example, are reactive in that they provide resources on demand. In such systems, resources may be allocated based on factors including demand, capacity, performance, and availability. However, these systems do not anticipate requests or identify and provide sets of resources based on current demand. Moreover, the prior art systems do not enable users to request allocation of computing resources based on factor relevant to a user of the computing resources. For example, existing systems may not enable a user to request allocation of computing resources based on security considerations (e.g., sharing of resources or environments with tenants), performance considerations (e.g., allocation of hypervisors to virtual machines), user-specific preferences, or geographic considerations (e.g., geographical location of computing resources to improve performance). Embodiments of the present invention address these and other issues related to allocation and management of computing resources based on user's needs.

Resource management system 140 may provide an end user (e.g., customer 130) with access to computing resources shown in FIG. 1. For example, as shown in FIG. 1, resource management system 140 can receive requests (e.g., resource request 132) from a user (e.g., customer 130). The request indicate one or more computing resources. In some embodiments, a request may correspond to or include an order or service subscription for one or more services of type IaaS, Paas, and/or SaaS.

A request may include information indicating a resource definition for allocation of computing resources for a user. Resources may be allocated for a user based on a service requested by the user. In some embodiments, a request may indicate the resources to allocate for a user, such as based on a resource definition. The resource definition may indicate a topology of the computing resources to allocate for the user. The topology may indicate what computing resources to allocate and how to allocate those computing resource. In some embodiments, a request may include a placement configuration to determine placement of those computing resources. A placement configuration may indicate placement of computing resources such as a geographic location, isolation of particular computing resources, sharing of computing resources with tenants, isolation of computing resources from tenants, a physical configuration of computing resources, and a logical organization of computing resources into one or more computing resource units.

Based on the information indicated by a request, resource management system 140 may determine a placement policy for allocation of computing resources indicated by the request. The placement policy can be selected based on information included in a request, e.g., a resource definition. A placement policy may indicate a placement of one or more computing resources requested by a user. The placement policy may indicate where and how computing resources are to be placed once allocated.

Figure 2:
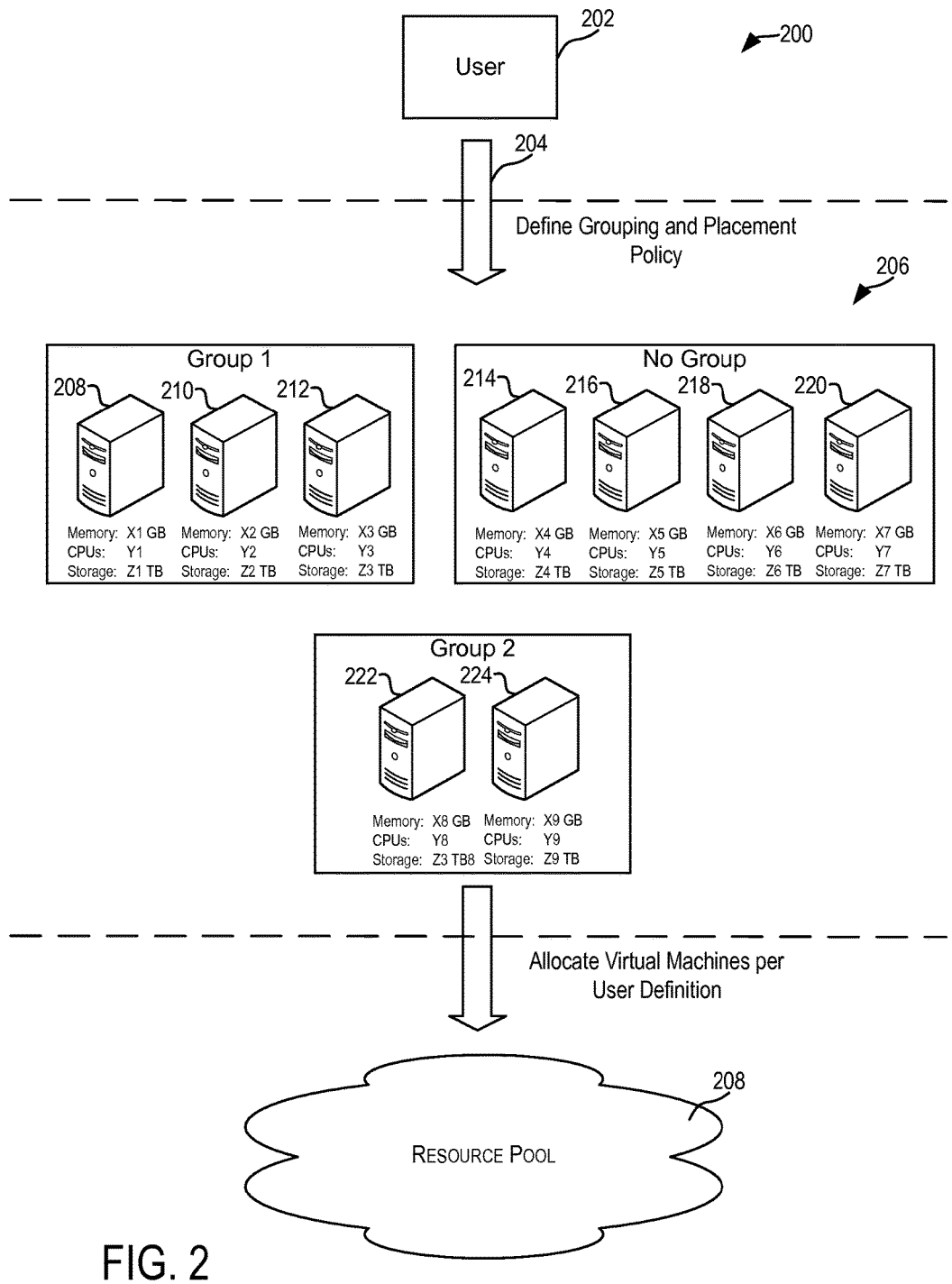
FIG. 2 depicts an example of placement policy-based resource allocation and management according to an embodiment of the present invention.

Now turning to FIG. 2, an example is depicted of placement policy-based resource allocation and management according to an embodiment of the present invention. As described above, typical PaaS, SaaS, and IaaS providers may not enable users to define what, how, and where their requested computing resources are provisioned. Instead, computing resources are typically allocated based on the provider of those computing resources. Allocation may occur in whatever manner is most cost effective for the provider. However, the allocation of computing resources by a provider may not be the most desirable for a user or may not provide the best user experience for the user.

Embodiments of the present invention expose fine-grained resource allocation capabilities to the user by enabling the user to define placement policies for their requests. This may provide a number of advantages to a user by affording the user with more control over the configuration of computing resources, not just selection of the resources. Enabling users to control configuration of their resources may further improve the efficiency of the user of such resources.

There are many examples by which enabling configuration of computing resources may be beneficial to use of those resources. For example, a user may have concerns with the security of his data, particularly where the data may be stored on the same computing node as other users' data. Although providers may provide guarantees as to data security, such guarantees may be insufficient for some users. The user may instead want their own computing nodes that are not shared (e.g., dedicated) with any other users (e.g., tenants) or shared with other users (e.g., tenants). The user may desire protection even one-step further requesting isolation of computing resources to different physical systems, data centers, and/or geographic regions. In some instances, a user may desire isolation of computing resources on a tenant-based level where resources are not accessible to other tenants.

In another example, users may have particular performance or redundancy requirements. A user may prefer to define a configuration of computing resources to ensure performance requirements are being met. In this instance, a user may desire to specifically define a configuration for resource allocation, where the configuration indicates an arrangement of computing resources.

To enable fine-grain resource allocation, embodiments of the present invention enable a user to define and/or select from a plurality of placement policies to accommodate users' needs. As used herein, placement policies refer to the rules that define how computing resources are allocated to a user. Placement policies can indicate allocation of resources based on a number of different factors.

Where performance is an issue, a placement policy may be defined such that computing resources may be grouped to run on a hypervisor or a set of hypervisors. Such a placement policy may be chosen to improve network communication and request/response times (e.g., reducing calls to the networking layer), when compared to traditional resource allocation methods, whereby resources may be spread between different hypervisors or sets of hypervisors for cost efficiency. In another example, shared storage resources may be best allocated in the same hypervisor or set of hypervisors as its associated compute nodes to improve performance. As described above, security concerns can be addressed by running resources on dedicated hypervisors. This can be used to secure data from malicious or inadvertent accesses between different users or between sets of data controlled by the same user that need to be maintained separately. Likewise, geographic restrictions (e.g., limitations on the locations of data centers that host the resources) may also be provided to meet particular security, performance, or regulatory requirements. Additionally, isolation and/or redundancy can be maintained by running particular resources on separate hypervisors or sets of hypervisors. This can be used to preserve data in case of failure or to perform management, administrative, or infrastructure operations (such as patching) on one set of resources, without affecting other resources (e.g., to reduce downtime). In some embodiments, an enterprise design, integration requirement, or other functional requirement may require that components can interoperate only within the scope of same hypervisor (e.g., SDI).

Examples of placement policies include a dedicated hypervisors policy in which allocated resources run on virtual machines placed to a set of hypervisors. The set of hypervisors are dedicated in that they are not shared with other users. A best fit placement policy may allocate virtual machines to a set of hypervisors to optimize computing resource utilization. For example, the set of hypervisors may be shared with other users (and run other resources), as needed, to save resources, maximize resource utilization, reduce fragmentation, or other resource optimization. In some embodiments, the best fit placement policy may be selected by default where no placement policy is specified by the user. A group fit placement policy may be used where a particular portion of computing resources are to be run together. Virtual machines can be grouped together and run on one or more hypervisors in the same hypervisor pool.

Placement policies may be customized as needed by users to create hybrid placement policies that incorporate features from one or more of the above described, or any other, placement policies.

As shown in FIG. 2, a user 202 can submit a resource request 204 to resource management system 140. Resource request 204 may include a definition 206 that defines a topology of computing resources that are requested. For example, definition 206 may indicate one or more types of computing resources and a quantity of each of the types of computing resource. A definition may include a processor definition, a memory definition, a virtual machine definition, or a combination thereof. A virtual machine definition may identify a set of virtual machines. Definition 206 may define individual compute nodes, such as memory, number of CPUs, storage requirements, and other specifications as required by the user. For example, as shown in definition 206, resource request 204 includes nine virtual machines, each with its own specification (e.g., memory, number of CPUs, and storage). The nine virtual machines are grouped such that group 1 includes three, group 2 includes 2, and the remaining four virtual machines are ungrouped. This definition represents a hybrid placement policy in that two groups are specified for a portion of the requested virtual machines, and a best fit policy can be applied to the remaining virtual machines.

In certain embodiments, a request may indicate a type of service for use of a plurality of computing resources. The definition may be identified based on the type of service. For example, a definition is identified based on a service for deployment using the plurality of computing resources.

Based on the definition, the requested resources can be allocated by a resource infrastructure system, e.g., resource pool 208. Resource pool 208 may include or may be implemented using one or more data centers. In some embodiments, resource pool 208 may be a hypervisor pool managed by a service provider (e.g., an IaaS provider). In some embodiments, resource pool 208 may include a plurality of resource pools that are distributed across multiple remote data centers. Further below with reference to FIG. 3 a resource pool is described in the context of resource management system 140. A placement of the plurality of computing resources may be established in resource pool 208 according to a placement configuration. The placement configuration may include characteristics for placement of computing resources requested by a user.

In one example, a placement configuration may include a geographic location where placement of the plurality of resources is established. In some embodiments, a placement configuration may indicate one or more groups of computing resources. For example, a placement configuration identifies a set of virtual machines allocated to a first group of the plurality of groups. A first computing resource of the plurality of computing resources is allocated to the first group based on the placement configuration.

In some embodiments, a placement configuration may include a security configuration to prevent access to the plurality of computing resources by other computing resources. For example, a security configuration may indicate one or more hypervisors allocated to manage the plurality of computing resources. The security configuration may indicate a set of virtual machines allocated to the hypervisor to support the plurality of computing resources. In another example, a placement configuration includes a performance configuration. The performance configuration may indicate a first computing resource allocated to a first hypervisor and may indicate a second computing resource allocated to a second hypervisor. The plurality of computing resources includes the first computing resource and the second computing resource.

Figure 3:
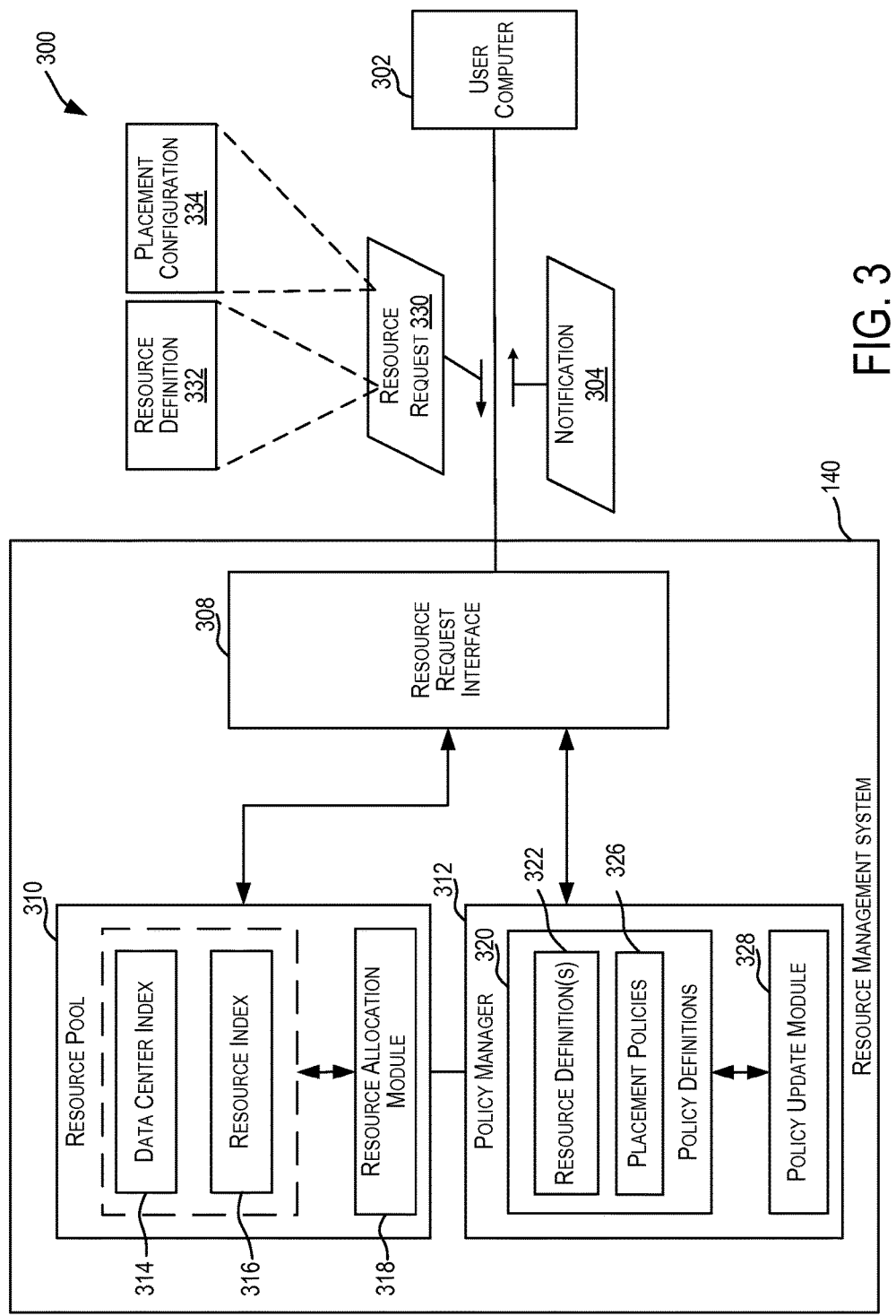
FIG. 3 depicts a more detailed high-level diagram of a system for placement policy-based resource allocation and management according to an embodiment of the present invention.

FIG. 3 depicts a more detailed high-level diagram of a system 300 for placement policy-based resource allocation and management according to an embodiment of the present invention. As shown in FIG. 3, a user can communicate with resource management system 140 using a computer (e.g., user computer 302) to send a resource request 304. Resource request 304 may indicate information one or more computing resources for allocation. In at least one embodiment, resource request 304 may include a definition (e.g., a resource definition 332) that indicates one or more computing resources requested by the user. In some embodiments, resource request 304 may include a placement configuration 334 that identifies information about placement (e.g., a physical location) for allocation of the computing resources indicated by the resource definition. For example, the placement may include a geographical location and/or a definition of one or more computing resource units. Information in resource request 304 may be used to determine a placement policy for those computing resources identified by resource definition 332.

Resource management system 140 may be implemented using a computer system. The computer system may include one or more computers and/or servers, which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computer system may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. Resource management system 140 may be implemented using hardware, firmware, software, or combinations thereof. In various embodiments, resource management system 140 may be configured to run one or more services or software applications described in the foregoing disclosure. For example, resource management system 140 may correspond to a computing system for performing processing as described herein according to an embodiment of the present disclosure. In some embodiments, resource management system 140 may be implemented using a cloud infrastructure system comprising one or more computers and/or servers that may include those described above.

Resource management system 140 may include several subsystems and/or modules, including some, which may not be shown. Resource management system 140 may have more or fewer subsystems and/or modules than shown in the figure, may combine two or more subsystems and/or modules, or may have a different configuration or arrangement of subsystems and/or modules. In some embodiments, resource management system 140 may include resource request interface 308, resource allocation module 318, and policy manager 312. Policy manager 312 may include a policy update module 328. Subsystems and modules of resource management system 140 may be implemented in software (e.g., program code, instructions executable by a processor), in hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

Resource management system 140 may provide other services and/or software applications in a virtual or non-virtual computing environment. Resource management system 140 may be configured to run one or more of these services or software applications described in the foregoing disclosure. The services offered by resource management system 140 may include, without limitation, SaaS services, PaaS services, and IaaS services. A client system may be communicatively coupled to resource management system 140. The services may be accessible via a communication network such as the Internet. Users operating a client system may use one or more applications to interact with resource management system 140 to access the services provided by resource management system 140.

Resource management system 140 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in resource management system 140 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

Resource management system 140 may include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. In some embodiments, resource management system 140 may be coupled to or may include one or more data stores, such as a data store for policy definitions 320 ("policy definitions"). Policy definitions 320 may include placement policies 326 and resource definitions 322.

In some embodiments, resource management system 140 may include or provide access to one or more resource pools, e.g., resource pool 310. Resource pool 310 may be supported by a resource infrastructure system. The resource infrastructure system may be implemented by resource management system 140 or accessed from a third party provider that implements the resource pool 310. The resource infrastructure system may be implemented as an IaaS service. Resource pool 310 may be implemented using one or more data centers managed by or accessible to resource management system 140. Resource pool 310 may provide access to one or computing resources. Resource allocation module 318 may provide support for allocation and management of computing resources provided by resource pool 310.

One or more indices may be maintained for access to computing resources in resource pool 310. An index may indicate what resources are currently available at a particular data center and/or what resources can be provided by each data center. For example, data center index 314 may indicate how many hypervisors are available in each connected data center and whether those hypervisors can be shared and/or used for dedicated placement policies. Similarly, resource index 316 may indicate what pre-existing resources are available at any given data center, such as current available application servers, RAC nodes, storage nodes, etc.

Resource management system 140 may receive resource requests (e.g., resource request 304) through resource request interface 308. Resource request interface 308 may communicate with multiple instances of client systems (e.g., clients associated with different users and/or multiple clients systems associated with the same user). In some embodiments, resource request interface 308 may support communication using one or more communication protocols (e.g., a web-based communication protocol) to facilitate communication between user computer 302 and resource management system 140. In some embodiments, resource request interface 308 may be defined by a programming interface (e.g., an application programming interface (API)). The programming interface may include callable functions to request computing resources from resource pool 310.

Resource request interface 308 may communicate resource requests to policy manager 312 and resource pool 310 for allocation of computing resources requested by a user. Resource pool 310 can serve as an interface to access one or more resource pools at one or more data centers managed by resource management system 140. Policy manager 312 can determine what computing resources are requested and according to what, if any, placement policy for allocating the computing resources in one or more resource pools. Policy manager 312 may communicate with resource allocation module 318 to request allocation of resources based on a placement policy.

Policy manager 312 can manage allocation and placement of computing resources using one or more policy definitions 320. A policy definition may include one or more placement policies 326 and one or more resource definitions 322. A placement policy may include information indicating how to configure computing resources. A resource definition may indicate one or more types of computing resources and the number of each of the types of computing resources to allocate. An example of a resource definition is described below with reference to FIG. 4. Computing resources allocated for a resource definition may be "placed," or configured according to a placement policy determined for placement of those resources. A policy definition may indicate a relationship between a placement policy and one or more resource definitions, such that a placement policy may be identified based on a relationship of the resource definition(s) to a placement policy A policy definition may be chosen based on a placement policy and a resource definition that satisfies a resource request.

One or more of placement policies 326 may be configured based on input from a user, such as preferences for a geographic location, security for computing resources (e.g., permitted users or tenants), isolation of resources, one or more groupings of computing resources, or allocation of hypervisors to virtual machines. Some of placement policies 326 may be defined based on more frequent or common types of placement of computing resources. Examples of placement policies may include those described above among others such as a best-fit placement policy, an isolation placement policy, a security placement policy, and a performance placement policy. For example, a performance placement policy may indicate a configuration of computing nodes on a single hypervisor as opposed to two different hypervisors. In another example, a security placement policy may indicate a configuration of computing resources within a single resource pool provided by resource pool 310, where the resource pool is isolated from other users. In another example, an isolation placement policy may indicate a configuration of computing nodes grouped onto a set of hypervisors isolated to a single resource pool not shared with computing resources allocated for other users.

In some embodiments, a placement policy may be defined based on a placement configuration, e.g., placement configuration 334, provided in resource request from a user. Placement configuration 334 may include information indicating one or more preferences for placement of computing resources, such as a security preference (e.g., allocation of resources to a secured resource pool that is not shared with other users), an isolation preference (e.g., allocation of computing resources to a particular pool separated from other resource pools), a performance preference (e.g., a particular number of resources), or a geographic preference (e.g., a geographic location of resources).

One or more of resource definitions 322 may be configured based on information received from a user. In some embodiments, a resource definition may be configured by a user, such as a user operating user computer 302. A resource definition may indicate one or more characteristics of computing resources. For example, a resource definition may indicate the types of resources and the amount of each type of resource to allocate. The types of resources may be indicated based on a service that is requested. In some embodiments, a resource definition may be configured for a type of use such testing, development, production, or the like. A resource definition can be selected from resource definitions 322 based input received in resource request 304. A resource request may indicate a type of use or one or more attributes related to use of computing resources, and the information in resource request may be used to identify one or more resource definitions that match the request. In some embodiments, a resource definition may be defined based on a resource definition, e.g., resource definition 332, received in resource request 330.

In some embodiments, policy manager 312 may identify a resource definition among resource definitions 322 for a resource request 33. As explained above, resource request 330 may include information useful for identifying a resource definition. In some instances, resource request 330 may include an identifier of a resource definition that can be used to identify a resource definition based on the identifier. In some embodiments, a resource definition may be identified based on one or more criteria for computing resources indicated in resource request 330. The criteria may include a number of resources, a type of service requested (e.g., a service for deployment), a type of resources, or a type of use (e.g., production, development, or testing). Examples of services may include one or more PaaS, Saas, and/or IaaS.

A request may define one or more computing resources of an infrastructure for an IaaS service. Policy manager 312 may choose a resource definition from amongst resource definitions 322 that matches the criteria. In some instances, a resource definition may be identified as matching that is closer among resources definitions 322 to the criteria. In some embodiments, resource request 330 may indicate a request for a service, suc that resource request 330 may not indicate a resource definition. Instead, resources may be defined based on policies identified corresponding to a service indicated in resource request 330.

Policy manager 312 may be configured to determine a placement policy for configuration of a set of computing resources requested by a resource request. In some embodiments, one or more criteria (e.g., placement configuration 334) may be included in resource request 330. The criteria in a resource request may be used to determine a placement policy from amongst placement policies 326. The criteria may include, without limitation, an organization (e.g., grouping) of computing resources, a geographical location for placement of computing resources, security isolation characteristics, sharing preferences (e.g., sharing or not sharing with users or other tenants), or an arrangement of particular types of computing resources (e.g., hypervisor to virtual machine allocation). Policy manager 312 may assess placement policies 326 to determine a placement policy that closes matches the criteria provided by a user in resource request 330. In some embodiments, one or more placement policies 326 may be stored in associated with one or more attributes defining a placement of computing resources. The attribute(s) may be compared with the criteria in resource request to identify a placement policy more closely matching a user's request.

Policy manager 312 may include policy update module 328, which is configured to update policy definitions 320. Policy definitions 320 may be updated based on information received from user computer 302. In some embodiments, policy update module 328 may dynamically create or modify policy definitions 320 based on previous resource requests. For example, policy update module 328 may create a new policy definition based on resource definitions and placement policies that are more frequently selected for resource requests. Based on a history of resources requested, policy update module 328 may create one or more new resource definitions and/or placement policies that more closely match criteria for resources that are requested.

Based on a policy definition chosen for a resource request, resource pool 310 may allocate one or more computing resources according to the policy definition. Resource allocation module 318 may allocate, using a placement policy and a resource definition of a policy definition, computing resources from resource pool 310. A resource definition may be used to determine computing resources to allocate in resource pool 310. A configuration of the computing resources may be determined based on the placement policy of a policy definition selected based on a resource request. Resource allocation module 318 may use data center index 314 and resource index 316 to identify computing resources for allocation according to the policy definition. Data center index 314 and resource index 316 may be updated to reflect computing resources allocated for a resource request. For example, upon allocation of computing resources according to the policy definition, data center index 314 and/or resource index 316 may be updated with data indicating information about the resources allocated to a user. An identified of a user may be stored in association with an identifier of each of the computing resources allocated for the user. Dara center index 314 and/or resource index 316 may be updated with an identifier of the user stored in association with the computing resources allocated for the user.

Resource allocation module 318 may deallocate computing resources that are no longer used for a resource request. Resource allocation module 318 may communicate with one or more data centers supporting resource pool 31 to allocated and/or deallocate computing resources. For example, resource allocation module 318 may communicate with geographically separated data centers to allocate computing resources according to a placement policy where the placement policy indicates allocation to different geographical locations. Resource allocation module 318 may communicate to policy manager 312 information (e.g., a status) about allocation and deallocation of computing resources in resource pool 310.

Policy manager 312 may determine whether computing resources have been allocated in resource pool 310 for a resource request. Based information received from resource allocation module 318, policy manager 312 may request a notification (e.g., notification 304) to be sent to user computer 302 to inform a user associated with resource request 330 about allocation of computing resources. Notification 304 may include information about computing resources that are allocated, and a manner (e.g., a configuration) in which the computing resources are allocation.

Typically, in a shared resource environment, such as a cloud resource pool, resources may be allocated by a provider for optimization based on factors including cost, performance, and availability. In such instances, the user is not given control to request allocation of resources based on considerations such as security, performance, and geographic location important to a user. By allocating computing resources based on a user's request, a user is afforded greater control in the allocation of those computing resources in a shared resource environment. In some embodiments, the user can provide c criteria such as a configuration of computing resources to ensure important considerations for security, performance, and operation are addressed.

FIG. 4 depicts an example of a data structure 400 for storing a resource definition of one or more computing resources according to some embodiments of the present invention. Data structure 400 provides one example a resource definition for a resource request. Data structure 400 may be included in a resource request for computing resources. In some embodiments, each instance of a data structure (e.g., data structure 400) may correspond to a resource definition in resource definitions 322. Computing resources may be allocated in a resource pool (e.g., resource pool 310) based on a resource definition.

Data structure 400 may be implemented as one or a combination of different types of data structures including, without restriction, an array, a record, a relational database table, a hash table, a linked list, or other types of data structures. For purposes of illustration, data structure 400 is shown in an arrangement with a particular number of fields (fields 402, 404, 406, 408, 410, and 412; however, data structure 400 may be defined by more or fewer fields in different arrangement than shown. The number and/or types of fields can vary based on computing resources that are requested. The data shown with respect to a particular field may be stored in data record 400 or may indicate a memory location where the data is stored.

Field 402 ("virtual machine identifiers") that includes information about virtual machines to be allocated. In some embodiments, field 402 may include identifiers of specific virtual machines to be allocated based on the resource definition of data structure 400. Field 404 may include information about the number of processors to be allocated for a resource definition. The number of processors may correspond to hardware processors (e.g., hardware processors). Field 406 may indicate the amount of memory to allocate. In some embodiments, field 406 and/or other fields may include information about the amount of memory to allocate for different computing resource units and may indicate the type of memory to allocate. Field 408 may include information about virtual machines, e.g., one or more names of virtual machines. In some embodiments, field 408 may include information about a configuration of virtual machines to hypervisors. Field 408 may include information about an arrangement or organization of allocating virtual machines to hypervisors. Field 410 may include information about one or more operating systems to implement for computing resources. Field 410 may indicate a type of operating system to implement. Field 412 may include group identification information, such as information about one or more computing resource units of the computing resources identified by data record 400.

In some embodiments, a resource definition can be provided in a text format. The resource definition may be stored in a format such as that shown in FIG. 4. Listing 1 shown below is an example a resource definition specified by a user:

Listing 1. Example Resource Definition

```
# ------------------------------------------------------------------------
TOPOLOGY = NUM_OF_VMS--
>VM_NO:VM_CPU_COUNT:VM_MEM_REQUIRED:VM_COMMENTS:VM_OS_TEMPLATE:GROUP_ID
# ------------------------------------------------------------------------
CRM_DEPLOYMENT = 13-->
1:8:32000:RAC_NODE1_HOST:OVM_OL5U6_X86_64_11203RAC_PVM:1,
2:8:32000:RAC_NODE2_HOST:OVM_OL5U6_X86_64_11203RAC_PVM:1,
3:0:0:RAC_NODE1_VIP_HOST:stit_oel5u6:1,
4:0:0:RAC_NODE2_VIP_HOST:stit_oel5u6:1,
5:0:0:RAC_CLUSTER_VIP_HOST:stit_oel5u6:1,
6:4:11264:IDM_HOST:HCM_DVF_REL5_GA_OIM:0,
7:2:1024:IDM_HOST2:HCM_DVF_REL5_GA_AUTHOHS:0,
8:4:12288:IDM_HOST3:HCM_DVF_REL5_GA_OID:0,
9:2:3072:OHS_HOST:HCM_DVF_REL5_GA_OHS:0,
10:4:15360:FA_ADMIN_HOST:HCM_DVF_REL5_GA_FA:0,
11:4:20480:FA_PRIMARY_HOST:HCM_DVF_REL5_GA_PRIMARY:0,
12:24:50176:FA_SECONDARY_HOST:HCM_DVF_REL5_GA_SECONDARY:0,
13:4:6144:BI_HOST:HCM_DVF_REL5_GA_BI:0
```

As shown the example of in Listing 1, thirteen virtual machines in two groups are indicated in a resource request. In some embodiments, groups can be identified based on names of VMs without explicit group IDs. Listing 1 defines an example resource definition for a customer relations manager (CRM) deployment. Each VM in the resource definition includes a VM number (VM_NO), a defined number of CPUs (VM_CPU_COUNT), a defined amount of memory (VM_MEM_REQUIRED), a VM name (VM_COMMENTS), and operating system definition (VM_OS_TEMPLATE), and a group ID (GROUP_ID). In some embodiments, the resource definition may include more or fewer requirements. For example, in some embodiments the resource definition for each VM may include a flag that indicates whether a proxy node is to be used. Some VMs, such as VMS 3-5, may be requested without a CPU or memory requirement, these VMs may be set up as IP addresses for the deployment.

As illustrated above, resource groups can be identified automatically based on the resource definition and/or defined explicitly in the resource definition. For example, in Listing 1, each virtual machine named "RAC_*" can be identified and allocated as a group in a resource pool. In some embodiments, recommended groups can be identified based on the node names and presented to a user for confirmation. In some embodiments, an explicit group ID can be included in the resource definition. For example, as shown in Listing 1, VMs 1-5 include a Group_ID of 1, while VMs 6-13 include a Group_ID of 0. In some embodiments, if the Group_ID corresponds to a pre-existing group, the newly requested VMs can be added to the pre-existing group.

Based on the resource definition, the requested resources can be allocated from resource pool 310. In some embodiments, resource pool 310 may be a hypervisor pool managed by an IaaS provider. In some embodiments, resource pool 310 may include a plurality of resource pools that are distributed across multiple remote data centers.

Figure 5:
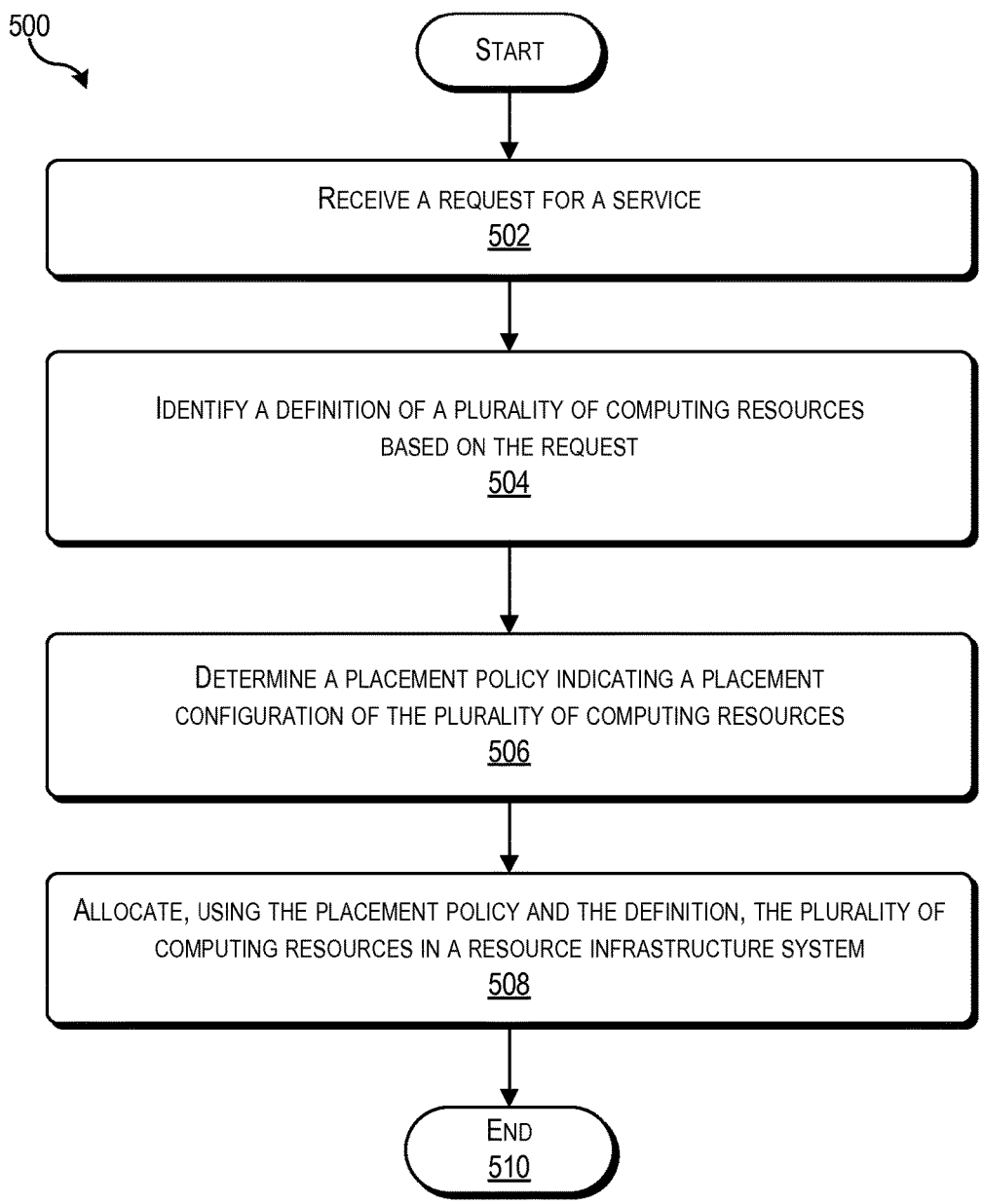
FIG. 5 depicts a flowchart illustrating a process of placement policy-based resource allocation according to an embodiment of the present invention.

FIG. 5 illustrates a flowchart 500 of a process of placement policy-based resource allocation according to an embodiment of the present invention. In some embodiments, the process depicted in flowchart 500 may be implemented by resource management system 140 of FIG. 1. Computing resources may be allocated by a resource infrastructure system, such as resource pool 310 of FIG. The resource infrastructure system may include one or more data centers to support allocation of computing resources. A resource infrastructure system may be included or implemented by resource management system 140. In some embodiments, resource management system 140 may determine the computing resources to allocate and a placement policy for configuration of those computing resources, and resource management system 140 may request a resource infrastructure system to allocate the computing resources.

Flowchart 500 may begin at step 502 by receiving a request for a service. For example, resource management system 140 may receive resource request 132 or resource request 330 for computing resources. The service may include one or more of an IaaS service, a PaaS service, or a SaaS service. A request may be received from a computer (e.g., user computer 302) operated by a user, such as a customer. Information in a request may be used to determine computing resources to be allocated and/or the placement of such resources.

A request may include information that indicates or information that is used to determine one or more computing resources requested by a user. Examples of computing resources may include, without restriction, one or more processing units (e.g., a processor or a multicore processor), one or more memory, one or more virtual machines, or one or more hypervisors. In some embodiments, a request may indicate a definition (e.g., a resource definition) of one or more computing resources requested by a user.

At step 504, a definition (e.g., a resource definition) of a plurality of computing resources may be identified. A definition may indicate characteristics of computing resources (e.g., a type of computing resources) to be allocated and the amount of computing resources. In some embodiments, a definition may be identified based on a request (e.g., request received at step 502). One or more definitions of computing resources may be configured by a user and selected based on information received in a request. For example, a request may indicate a configured definition or one or more criteria for selecting a configured definition. In some embodiments, a resource definition may be identified based on the service requested. A service may be defined based on a resource definition indicating the type and the quantity of computing resources to enable the service.

A placement policy indicating a placement configuration of the plurality of computing resources may be determined at step 506. In some embodiments, a placement policy may be determined based in information included in a request. A request may indicate one or more characteristics for placement of computing resources requested. For example, a request may include a placement configuration. A placement policy may be selected from a plurality of placement policies based on identifying a placement policy that matches the placement configuration. In some instances, a placement policy may be determined as one that most closely satisfies the characteristics for placement of computing resources requested. Placement characteristics may relate to placement of computing resources, such as a grouping of computing resources (e.g., one or more group definitions of a type of computing resources), one or more location characteristics (e.g., a geographic location), or one or more security characteristics (e.g., an isolated environment or an isolated computing resources).

At step 508, using a placement policy and a definition, computing resources may be allocated. For example, resource management system 140 may request the computing resources to be allocated in a resource pool. The information in the placement policy and the definition may be provided to a resource infrastructure system to allocate the computing resources. At step 510, the process of flowchart 500 ends.

Figure 6:
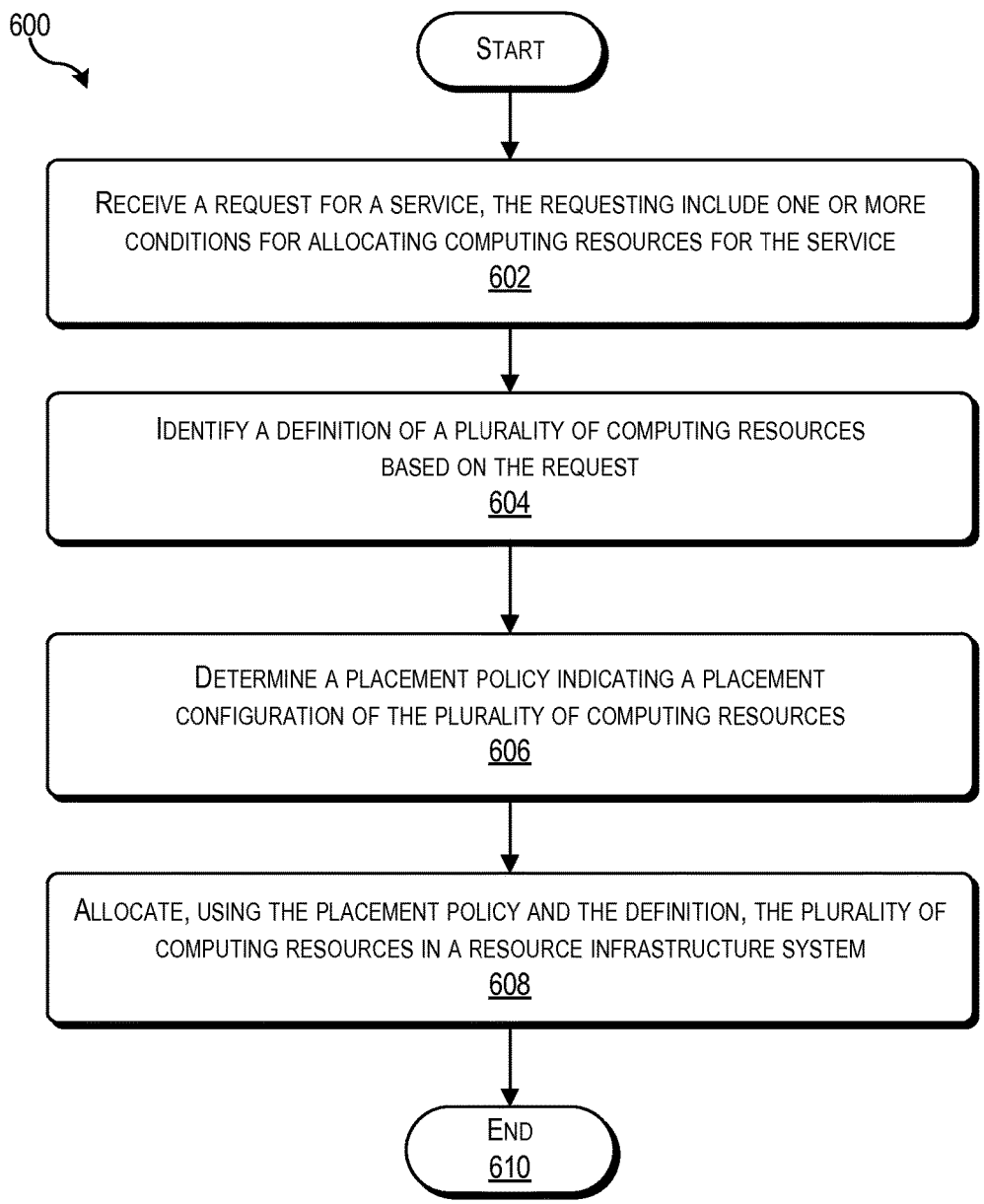
FIG. 6 depicts a flowchart illustrating a process of placement policy-based resource allocation according to an embodiment of the present invention.

FIG. 6 illustrates a flowchart 600 of a process of placement policy-based resource allocation according to an embodiment of the present invention. In some embodiments, the process depicted in flowchart 600 may be implemented by resource management system 140 of FIG. 1. Computing resources may be allocated by a resource infrastructure system, such as resource pool 310 of FIG. The resource infrastructure system may include one or more data centers to support allocation of computing resources. A resource infrastructure system may be included or implemented by resource management system 140. In some embodiments, resource management system 140 may determine the computing resources to allocate and a placement policy for configuration of those computing resources, and resource management system 140 may request a resource infrastructure system to allocate the computing resources.

Flowchart 600 may begin at step 602 by receiving a request for a service. For example, resource management system 140 may receive an order for a subscription to a service. A service may include one or more of an IaaS service, a PaaS service, or a SaaS service. Information in a request may be used to determine computing resources to be allocated and/or the placement of such resources.

A request may include information that indicates or information that is used to determine one or more computing resources requested by a user. Examples of computing resources may include, without restriction, one or more processing units (e.g., a processor or a multicore processor), one or more memory, one or more virtual machines, or one or more hypervisors. In some embodiments, a request may indicate a definition (e.g., a resource definition) of one or more computing resources requested by a user.

In some embodiments the request may include one or more criteria (e.g., conditions) for the requested service. The criteria may indicate how one or more computing resources are allocated for the service. The computing resources may include those for enabling the service. The criteria may indicate placement characteristics for allocating the computing resources. The criteria may indicate when, how, and/or what resources are allocated for the service. For example, the criteria may indicate a grouping of computing resources (e.g., one or more group definitions of a type of computing resources), one or more location characteristics (e.g., a geographic location), or one or more security characteristics (e.g., an isolated environment or an isolated computing resources). In some embodiments, the criteria may indicate whether resources are to be allocated with or not allocated with a particular tenant in a multi-tenant environment. The criteria may indicate the types of resources that can be shared and/or with whom the types of resources can be shared.

At step 604, a definition (e.g., a resource definition) of a plurality of computing resources may be identified. A definition may indicate characteristics of computing resources (e.g., a type of computing resources) to be allocated and the amount of computing resources. In some embodiments, a definition may be identified based on a request (e.g., request received at step 602). For example, the resource definition based be identified based on the type of service requested by a user. A resource definition may be defined for each type of service or a specific service. When a request is for an IaaS service, the request may include the resources to be allocated for the user. The request may include or identify one or more definitions of computing resources may be configured by a user and selected based on information received in a request. In some embodiments, a resource definition may be identified based on the service requested. A service may be defined based on a resource definition indicating the type and the quantity of computing resources to enable the service.

In some embodiments, a placement policy indicating a placement configuration of the plurality of computing resources may be determined at step 606. In some embodiments, a placement policy may be determined based on the criteria included in a request. A request may indicate one or more characteristics for placement of computing resources requested. For example, a request may include a placement configuration. A placement policy may be selected from a plurality of placement policies based on identifying a placement policy that matches the placement configuration. In some instances, a placement policy may be determined as one that most closely satisfies the characteristics for placement of computing resources requested. Placement characteristics may relate to placement of computing resources, such as a grouping of computing resources (e.g., one or more group definitions of a type of computing resources), one or more location characteristics (e.g., a geographic location), or one or more security characteristics (e.g., an isolated environment or an isolated computing resources). The placement characteristics may be determined in part based on the criteria in the request.

At step 608, using a placement policy and a definition, computing resources may be allocated. For example, resource management system 140 may request the computing resources to be allocated in a resource pool. The information in the placement policy and the definition may be provided to a resource infrastructure system to allocate the computing resources. At step 610, the process of flowchart 600 ends.

The processes depicted by in FIGS. 5 and 6 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIGS. 5 and 6 are not intended to be limiting. Other sequences of steps may also be performed according to alternative embodiments. For example, alternative embodiments of the present invention may perform the steps outlined above in a different order. Moreover, the individual steps illustrated in FIGS. 5 and 6 may include multiple sub-steps that may be performed in various sequences as appropriate to the individual step. Furthermore, additional steps may be added or removed depending on the particular applications. While processing depicted in each of FIGS. 5 and 6 is with respect to placement policy-based resource allocation based on a request from a user, such processing may be performed for multiple resources requests indicating different types of characteristics for allocating computing resources. One of ordinary skill in the art would recognize many variations, modifications, and alternatives.

Figure 7:
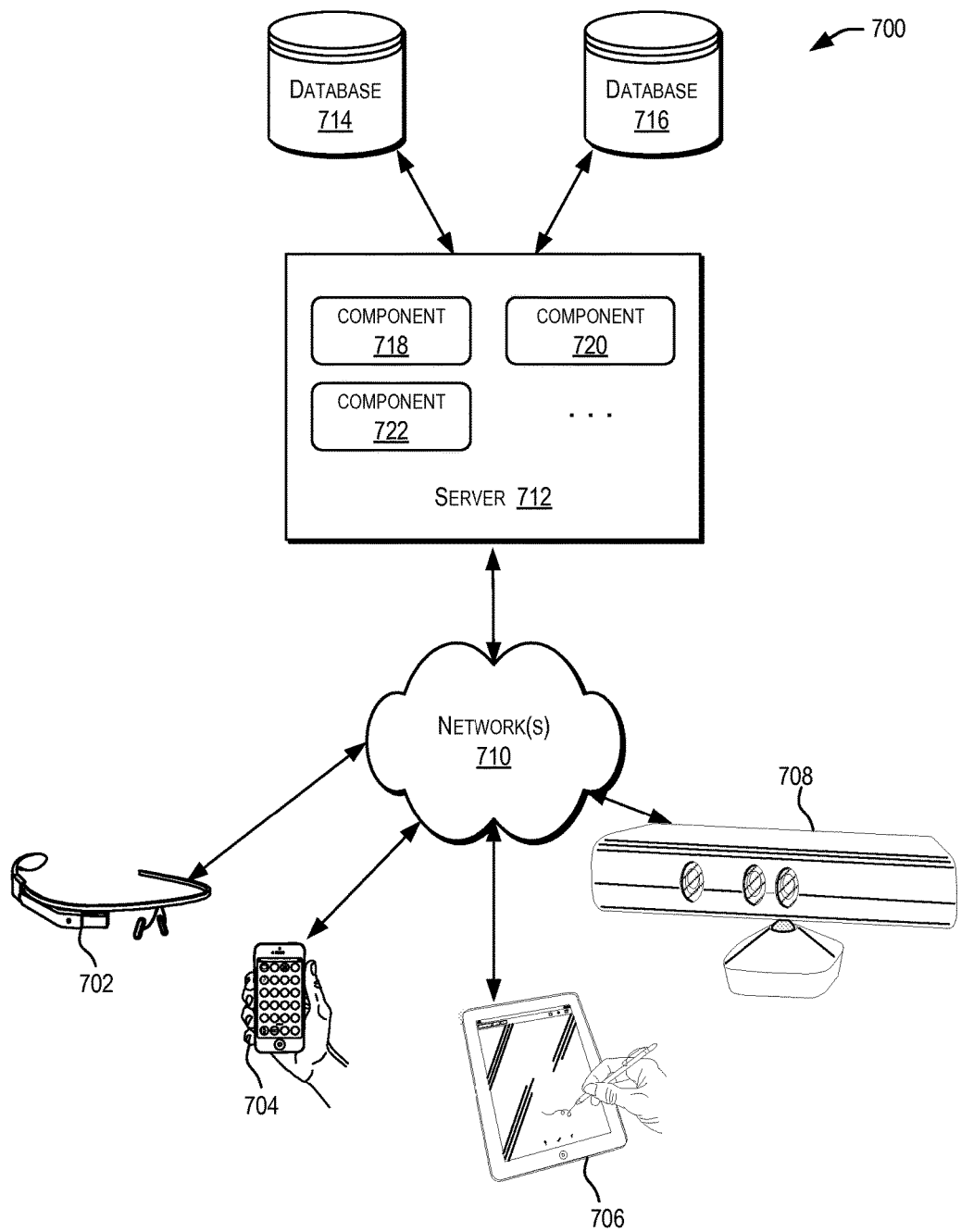
FIG. 7 depicts a simplified diagram of a distributed system for implementing an embodiment.

FIG. 7 depicts a simplified diagram of a distributed system 700 for implementing an embodiment. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various embodiments, server 712 may be adapted to run one or more services or software applications such as services and applications for placement policy-based resource allocation. In certain embodiments, server 712 may also provide other services or software applications can include non-virtual and virtual environments. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in FIG. 7 is thus one example of a distributed system for implementing an embodiment system and is not intended to be limiting.

Client computing devices 702, 704, 706, and/or 708 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 710.

Although distributed system 700 in FIG. 7 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization. One or more flexible pools of logical storage devices can be virtualized to maintain virtual storage devices for the server. Virtual networks can be controlled by server 712 using software defined networking. In various embodiments, server 712 may be adapted to run one or more services or software applications described in the foregoing disclosure. For example, server 712 may correspond to a server for performing processing as described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. These databases may provide a mechanism for storing information such as user interactions information, usage patterns information, adaptation rules information, and other information used by embodiments of the present invention. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle that are adapted to store, update, and retrieve data in response to SQL-formatted commands.

Figure 8:
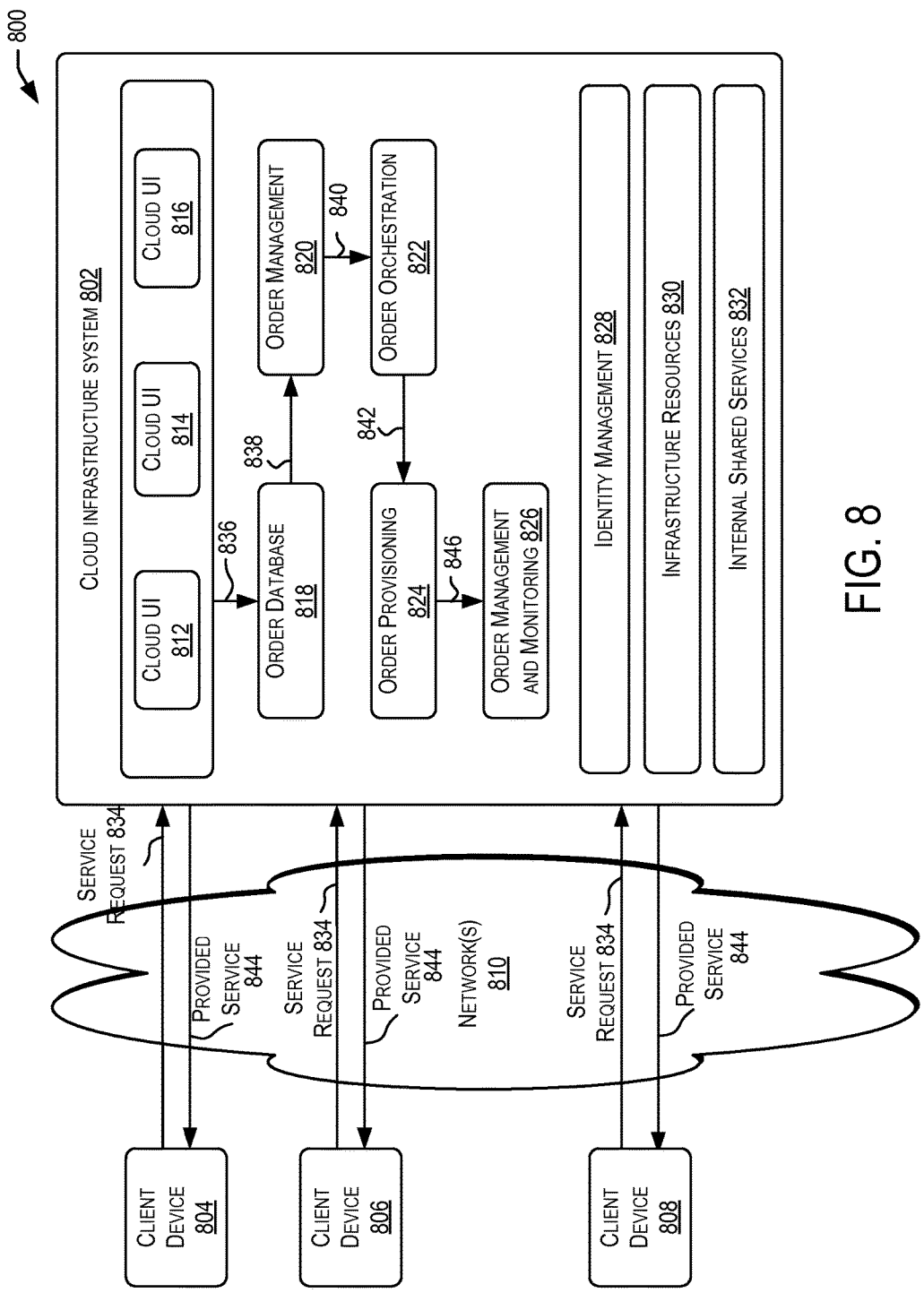
FIG. 8 illustrates a simplified block diagram of one or more components of a system environment in which services may be offered as cloud services, in accordance with an embodiment of the present disclosure.

In some embodiments, a cloud environment may provide one or more services for placement policy-based resource allocation. FIG. 8 is a simplified block diagram of one or more components of a system environment 700 in which services may be offered as cloud services, in accordance with an embodiment of the present disclosure. In the illustrated embodiment in FIG. 8, system environment 800 includes one or more client computing devices 804, 806, and 808 that may be used by users to interact with a cloud infrastructure system 802 that provides cloud services, including services for placement policy-based resource allocation. Cloud infrastructure system 802 may comprise one or more computers and/or servers that may include those described above for server 712.

It should be appreciated that cloud infrastructure system 802 depicted in FIG. 8 may have other components than those depicted. Further, the embodiment shown in FIG. 8 is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for client computing devices 702, 704, 706, and 708. Client computing devices 804, 806, and 808 may be configured to operate a client application such as a web browser, a proprietary client application (e.g., Oracle Forms), or some other application, which may be used by a user of the client computing device to interact with cloud infrastructure system 802 to use services provided by cloud infrastructure system 802. Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between client computing devices 804, 806, and 808 and cloud infrastructure system 802. Each network may be any type of network familiar to those skilled in the art that can support data communications using any of a variety of commercially-available protocols, including those described above for network(s) 710.

In certain embodiments, services provided by cloud infrastructure system 802 may include a host of services that are made available to users of the cloud infrastructure system on demand. In addition to services related to placement policy-based resource allocation, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 802 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle Corporation) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform, and other resources.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 to enable provision of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in FIG. 8, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In an exemplary operation, at step 834, a customer using a client device, such as client computing devices 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI) such as cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

At step 836, the order information received from the customer may be stored in an order database 818. If this is a new order, a new record may be created for the order. In one embodiment, order database 818 can be one of several databases operated by cloud infrastructure system 818 and operated in conjunction with other system elements.

At step 838, the order information may be forwarded to an order management module 820 that may be configured to perform billing and accounting functions related to the order, such as verifying the order, and upon verification, booking the order.

At step 840, information regarding the order may be communicated to an order orchestration module 822 that is configured to orchestrate the provisioning of services and resources for the order placed by the customer. In some instances, order orchestration module 822 may use the services of order provisioning module 824 for the provisioning. In certain embodiments, order orchestration module 822 enables the management of business processes associated with each order and applies business logic to determine whether an order should proceed to provisioning.

As shown in the embodiment depicted in FIG. 8, at step 842, upon receiving an order for a new subscription, order orchestration module 822 sends a request to order provisioning module 824 to allocate resources and configure resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. This enables order orchestration module 822 to be isolated from implementation details, such as whether or not services and resources are actually provisioned on the fly or pre-provisioned and only allocated/assigned upon request.

At step 844, once the services and resources are provisioned, a notification may be sent to the subscribing customers indicating that the requested service is now ready for use. In some instance, information (e.g. a link) may be sent to the customer that enables the customer to start using the requested services.

At step 846, a customer's subscription order may be managed and tracked by an order management and monitoring module 826. In some instances, order management and monitoring module 826 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 800 may include an identity management module 828 that is configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
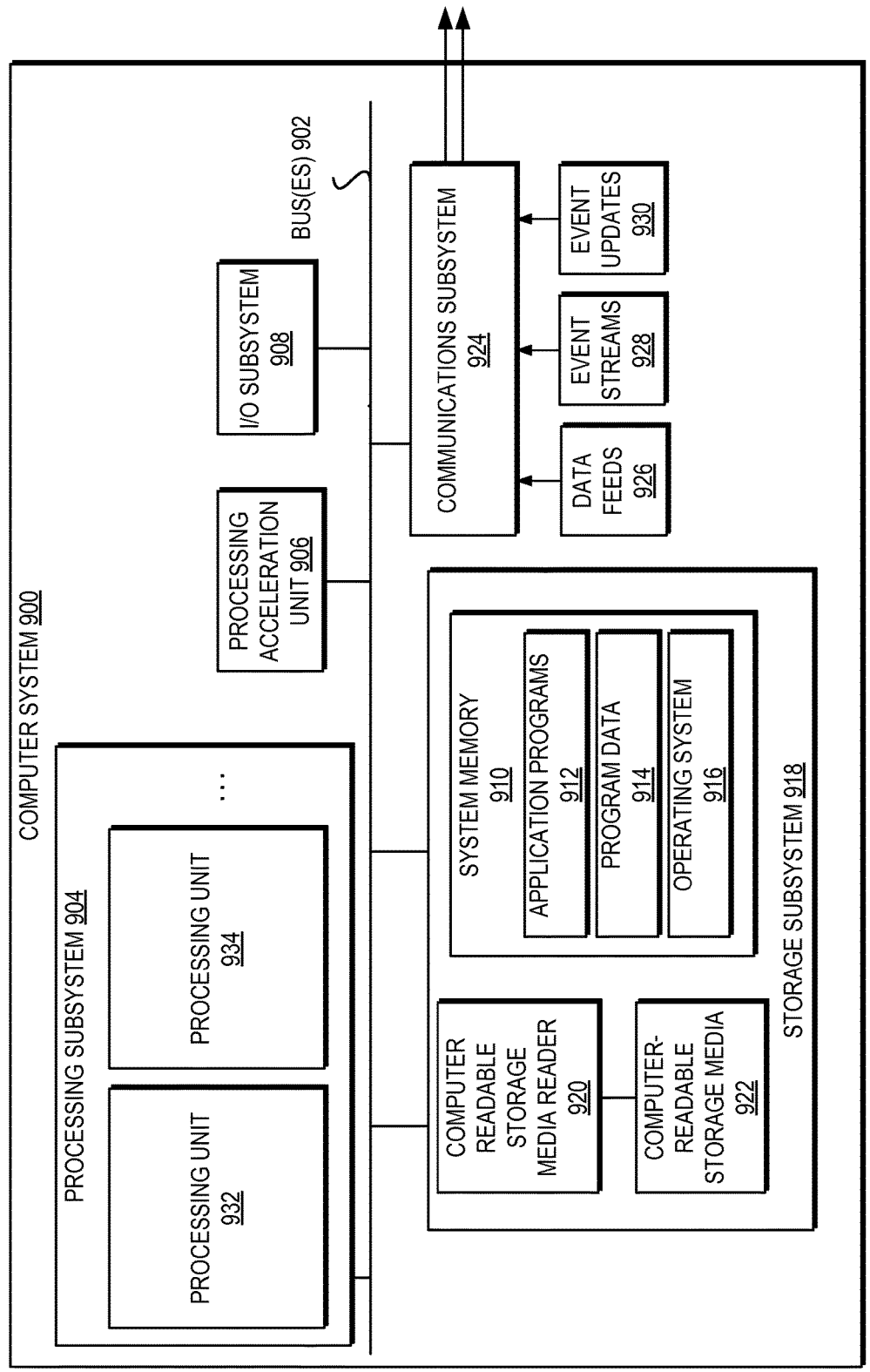
FIG. 9 illustrates an exemplary computer system that may be used to implement an embodiment of the present invention.

FIG. 9 illustrates an exemplary computer system 900 that may be used to implement an embodiment of the present invention. In some embodiments, computer system 900 may be used to implement any of the various servers and computer systems described above. As shown in FIG. 9, computer system 900 includes various subsystems including a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above for placement policy-based resource allocation.

In certain embodiments, a processing acceleration unit 906 may be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term "input device" is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 900. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used in accordance with the present invention.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 9, system memory 910 may store application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 922 may store programming and data constructs that provide the functionality of some embodiments. Software (programs, code modules, instructions) that when executed by processing subsystem 904 a processor provide the functionality described above may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 922 may provide storage of computer-readable instructions, data structures, program modules, and other data for computer system 900.

In certain embodiments, storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, computer system 900 may provide support for executing one or more virtual machines. Computer system 900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 900. Accordingly, multiple operating systems may potentially be run concurrently by computer system 900. Each virtual machine generally runs independently of the other virtual machines.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client computing devices via the Internet for receiving and sending information from and to the client computing devices.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

According to an embodiment of the present disclosure, there is provided a resource management system, comprising: a resource request interface, configured to receive a request for a service; a policy manager, configured to identify a definition of a plurality of computing resources based on the request, the definition indicating one or more characteristics for the plurality of computing resources, and determine a placement policy indicating a placement configuration of the plurality of computing resources; and a resource allocation module, configured to allocate, using the placement policy and the definition, the plurality of computing resources in a resource infrastructure system, the resource infrastructure system including one or more data centers.

In an example, the request includes the definition, and wherein the definition includes a processor definition, a memory definition, and a virtual machine definition, the virtual machine definition identifying a set of virtual machines.

In an example, the request indicates a type of service for use of the plurality of computing resources, and wherein the definition is identified based on the type of service.

In an example, the definition is identified based on a service for deployment using the plurality of computing resources.

In an example, the resource allocation module is further configured to establish, according to the placement configuration, a placement of the plurality of computing resources in the resource infrastructure system, wherein the placement configuration includes a geographic location where placement of the plurality of resources is established.

In an example, the placement configuration indicates a plurality of groups, wherein the placement configuration identifies a set of virtual machines allocated to a first group of the plurality of groups, and wherein a first computing resource of the plurality of computing resources is allocated to the first group based on the placement configuration.

In an example, the placement configuration includes security configuration to prevent access to the plurality of computing resources by other computing resources, and wherein the security configuration indicates one or more hypervisors allocated to manage the plurality of computing resources.

In an example, the security configuration further indicates a set of virtual machines allocated to the hypervisor to support the plurality of computing resources.

In an example, the placement configuration includes a performance configuration, the performance configuration indicating a first computing resource allocated to a first hypervisor and indicating a second computing resource allocated to a second hypervisor, and wherein the plurality of computing resources includes the first computing resource and the second computing resource.

According to another embodiment of the present disclosure, there is provided a computer system, comprising: a communication subsystem; and a processing subsystem coupled to the communication subsystem and configured to: receive a request via the communication subsystem; identify a definition of a plurality of computing resources based on the request, the definition indicating one or more characteristics for the plurality of computing resources; determine a placement policy indicating a placement configuration of the plurality of computing resources; and allocate, using the placement policy and the definition, the plurality of computing resources in a resource infrastructure system, the resource infrastructure system including one or more data centers.

In an example, the computer system further comprises the resource infrastructure system.

In an example, the request includes the definition, and wherein the definition includes a processor definition, a memory definition, and a virtual machine definition, the virtual machine definition identifying a set of virtual machines.

In an example, the request indicates a type of service for use of the plurality of computing resources, and wherein the definition is identified based on the type of service.

In an example, the placement configuration indicates a plurality of groups, wherein the placement configuration identifies a set of virtual machines allocated to a first group of the plurality of groups, and wherein a first computing resource of the plurality of computing resources is allocated to the first group based on the placement configuration.

In an example, the placement configuration includes security configuration to prevent access to the plurality of computing resources by other computing resources, and wherein the security configuration indicates one or more hypervisors allocated to manage the plurality of computing resources.

It is apparent for those skilled in the art that, for the particular operation processes of components of the resource management system and computer system described above, reference may be made to the corresponding steps/components in the related method/system embodiment sharing the same concept and the reference is regarded as the disclosure of the related units too. And therefore some of the particular operation processed will not be described repeatedly or in detail for concision of the description.

Although specific embodiments of the invention have been described, various modifications, alterations, alternative constructions, and equivalents are also encompassed within the scope of the invention. The modifications include any relevant combination of the disclosed features. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware including FPGA, ASIC etc., or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
   receiving a request for a service;
   identifying, by a computer system, a definition of a plurality of computing resources based on the request, the definition indicating one or more characteristics for placement of the plurality of computing resources;
   determining, by the computer system, a placement policy from a plurality of placement policies based on identifying the placement policy as satisfying more of the one or more characteristics for placement of the plurality of computing resources than any other policy from the plurality of placement policies, wherein the placement policy indicates a placement configuration of the plurality of computing resources; and
   allocating, using the placement policy and the definition, the plurality of computing resources in a resource infrastructure system, the resource infrastructure system including one or more data centers.

2. The method of claim 1, wherein the request includes the definition, and wherein the definition includes a processor definition, a memory definition, and a virtual machine definition, the virtual machine definition identifying a set of virtual machines.

3. The method of claim 1, wherein the request indicates a type of service for use of the plurality of computing resources, and wherein the definition is identified based on the type of service.

4. The method of claim 1, wherein the definition is identified based on a service for deployment using the plurality of computing resources.

5. The method of claim 1, further comprising: establishing, according to the placement configuration, a placement of the plurality of computing resources in the resource infrastructure system, wherein the placement configuration includes a geographic location where placement of the plurality of resources is established.

6. The method of claim 1, wherein the placement configuration indicates a plurality of groups, wherein the placement configuration identifies a set of virtual machines allocated to a first group of the plurality of groups, and wherein a first computing resource of the plurality of computing resources is allocated to the first group based on the placement configuration.

7. The method of claim 1, wherein the placement configuration includes security configuration to prevent access to the plurality of computing resources by other computing resources, and wherein the security configuration indicates one or more hypervisors allocated to manage the plurality of computing resources.

8. The method of claim 7, wherein the security configuration further indicates a set of virtual machines allocated to the hypervisor to support the plurality of computing resources.

9. The method of claim 1, wherein the placement configuration includes a performance configuration, the performance configuration indicating a first computing resource allocated to a first hypervisor and indicating a second computing resource allocated to a second hypervisor, and wherein the plurality of computing resources includes the first computing resource and the second computing resource.

10. A system comprising:
    one or more processors; and
    a memory coupled with and readable by the one or more processors, the memory configured to store a set of instructions that, when executed by the one or more processors, causes the one or more processors to:
    receive a request for a service;
    identify a definition of a plurality of computing resources based on the request, the definition indicating one or more characteristics for the plurality of computing resources;

determine a placement policy from a plurality of placement policies based on identifying the placement policy as satisfying more of the one or more characteristics for placement of the plurality of computing resources than any other policy from the plurality of placement policies, wherein the placement policy indicates a placement configuration of the plurality of computing resources; and allocate, using the placement policy and the definition, the plurality of computing resources in a resource infrastructure system, the resource infrastructure system including one or more data centers.

11. The system of claim 10, further comprising the resource infrastructure system.

12. The system of claim 10, wherein the request includes the definition, and wherein the definition includes a processor definition, a memory definition, and a virtual machine definition, the virtual machine definition identifying a set of virtual machines.

13. The system of claim 10, wherein the request indicates a type of service for use of the plurality of computing resources, and wherein the definition is identified based on the type of service.

14. The system of claim 10, wherein the placement configuration indicates a plurality of groups, wherein the placement configuration identifies a set of virtual machines allocated to a first group of the plurality of groups, and wherein a first computing resource of the plurality of computing resources is allocated to the first group based on the placement configuration.

15. The system of claim 10, wherein the placement configuration includes security configuration to prevent access to the plurality of computing resources by other computing resources, and wherein the security configuration indicates one or more hypervisors allocated to manage the plurality of computing resources.

16. A non-transitory computer-readable medium storing a set of instructions that are executable by one or more processors to cause the one or more processors to:

receive a request for a service;

identify, by a computer system, a definition of a plurality of computing resources based on the request, the definition indicating one or more characteristics for the plurality of computing resources;

determine, by the computer system, a placement policy from a plurality of placement policies based on identifying the placement policy as satisfying more of the one or more characteristics for placement of the plurality of computing resources than any other policy from the plurality of placement policies, wherein the placement policy indicates a placement configuration of the plurality of computing resources; and allocate, using the placement policy and the definition, the plurality of computing resources in a resource infrastructure system, the resource infrastructure system including one or more data centers.

17. The non-transitory computer-readable medium of claim 16, wherein the request includes the definition, and wherein the definition includes a processor definition, a memory definition, and a virtual machine definition, the virtual machine definition identifying a set of virtual machines.

18. The non-transitory computer-readable medium of claim 16, wherein the request indicates a type of service for use of the plurality of computing resources, and wherein the definition is identified based on the type of service.

19. The non-transitory computer-readable medium of claim 16, wherein the placement configuration indicates a plurality of groups, wherein the placement configuration identifies a set of virtual machines allocated to a first group of the plurality of groups, and wherein a first computing resource of the plurality of computing resources is allocated to the first group based on the placement configuration.

20. The non-transitory computer-readable medium of claim 16, wherein the placement configuration includes security configuration to prevent access to the plurality of computing resources by other computing resources, and wherein the security configuration indicates one or more hypervisors allocated to manage the plurality of computing resources.

* * * * *

UNITED STATES PATENT AND TRADEMARK OFFICE
CERTIFICATE OF CORRECTION

PATENT NO. : 9,912,609 B2
APPLICATION NO. : 14/819922
DATED : March 6, 2018
INVENTOR(S) : Jacob et al.

It is certified that error appears in the above-identified patent and that said Letters Patent is hereby corrected as shown below:

In the Specification

In Column 16, Line 8, delete "suc" and insert -- such --, therefor.

Signed and Sealed this
Twenty-eighth Day of August, 2018

Andrei Iancu
*Director of the United States Patent and Trademark Office*